United States Patent
Liu et al.

(10) Patent No.: US 11,496,038 B2
(45) Date of Patent: Nov. 8, 2022

(54) CONVERSION SYSTEM AND CONTROL METHOD

(71) Applicant: Delta Electronics (Shanghai) Co., Ltd., Shanghai (CN)

(72) Inventors: Hong Liu, Shanghai (CN); Yong Tao, Shanghai (CN); Cheng Lu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/383,457

(22) Filed: Jul. 23, 2021

(65) Prior Publication Data

US 2022/0052622 A1 Feb. 17, 2022

(30) Foreign Application Priority Data

Aug. 14, 2020 (CN) .......................... 202010816460.7
May 27, 2021 (CN) .......................... 202110587240.6

(51) Int. Cl.
*H02M 1/00* (2006.01)
*H02M 7/483* (2007.01)
*H02M 7/219* (2006.01)

(52) U.S. Cl.
CPC ......... *H02M 1/0074* (2021.05); *H02M 7/219* (2013.01); *H02M 1/0003* (2021.05);
(Continued)

(58) Field of Classification Search
CPC ............. H02M 1/0074; H02M 1/0003; H02M 1/0043; H02M 7/219; H02M 7/4833; H02M 7/4835

See application file for complete search history.

(56) References Cited

FOREIGN PATENT DOCUMENTS

| CN | 202455073 U | 9/2012 |
| CN | 103546024 A | 1/2014 |

(Continued)

OTHER PUBLICATIONS

Yang et al., "Control Conflict Suppressing and Stability Improving for an MMC Distributed Control System," in IEEE Transactions on Power Electronics, vol. 35, No. 12, pp. 13735-13747, May 20, 2020.

(Continued)

*Primary Examiner* — Jue Zhang
(74) *Attorney, Agent, or Firm* — CKC & Partners Co., LLC

(57) ABSTRACT

The present application provides a conversion system and a control method, including N power converters and N controllers, where each power converter includes a first side and a second side, the first sides of the N power converters are electrically coupled in series, and currents flowing through the first sides of the N power converters are the same, the N controllers correspond to the N power converters one to one. Each controller contains a common-mode voltage loop and a current loop. The common-mode voltage loop is configured to receive a voltage reference signal and a voltage feedback signal, and output a given signal. The current loop is configured to receive the given signal, a current reference signal, and a first side current of a corresponding power converter, and output a common-mode control signal to modulate a first side voltage of the corresponding power converter.

16 Claims, 14 Drawing Sheets

(52) U.S. Cl.
CPC ........ *H02M 1/0043* (2021.05); *H02M 7/4833* (2021.05); *H02M 7/4835* (2021.05)

(56) References Cited

FOREIGN PATENT DOCUMENTS

| | | | |
|---|---|---|---|
| CN | 103956915 B | 8/2016 | |
| CN | 104038060 B | 8/2016 | |
| CN | 107294387 A | 10/2017 | |
| WO | WO-2017071977 A1 * | 5/2017 | ............ H02M 1/088 |

OTHER PUBLICATIONS

Koyama et al., "Current Control of Modular Multilevel Converters Using a Daisy-Chained Distributed Control System with Communication Path Redundancy," IECON 2019—45th Annual Conference of the IEEE Industrial Electronics Society, Oct. 14, 2019, pp. 6108-6113.

Tu et al., "A hybrid communication topology for modular multilevel converter," 2018 IEEE Applied Power Electronics Conference and Exposition (APEC), Mar. 4, 2018, pp. 3051-3056.

Hou et al., "A General Decentralized Control Scheme for Medium-/High-Voltage Cascaded STATCOM," in IEEE Transactions on Power Systems, vol. 33, No. 6, Nov. 1, 2018, pp. 7296-7300.

Anonymous: "Ring network-Wikipedia", Feb. 18, 2020, retrieved from the Internet: URL:https://en.wikipedia.org/w/index.php?title=Ring_network&oldid=941421513 (retrieved on Dec. 17, 2021).

Anonymous: "Spanning Tree Protocol-Wikipedia", Jul. 14, 2020, retrieved from the Internet: URL:https://en.wikipedia.org/w/index.php?title=Spanning_Tree_Protocol&oldid=967679778 (retrieved on Dec. 17, 2021).

Corresponding extended European search report dated Jan. 10, 2022. (10 pages).

Corresponding extended European search report dated Jan. 5, 2022. (11 pages).

* cited by examiner

CONVERSION SYSTEM AND CONTROL METHOD

CROSS-REFERENCE TO RELATED APPLICATIONS

This application claims priority to Chinese Patent Application No. 202010816460.7, which was filed with the China National Intellectual Property Administration on Aug. 14, 2020, and titled "CONVERSION SYSTEM AND CONTROL METHOD", and Chinese Patent Application No. 202110587240.6, which was filed with the China National Intellectual Property Administration on May 27, 2021, and titled "CONVERSION SYSTEM AND CONTROL METHOD". The entire contents of these applications are incorporated in this application by reference.

TECHNICAL FIELD

The present application relates to the field of power electronic technologies, and in particular, to a conversion system and a control method.

BACKGROUND

A power electronic converter is a device that uses power electronic components to convert electrical energy. A cascade converter includes a plurality of power electronic converters (hereinafter referred to as power converters) with input sides connected in series. Due to high modularity degree and good scalable performance of the cascade converter, it is widely used in power apparatuses, such as Electronic Power Transformers (EPT), Static Var Compensators (SVC) and medium and high voltage high-power inverters.

A cascade conversion system generally adopts centralized control or partial centralized control. In centralized control, a central controller collects input signals and an output signal of each power converter, performs calculation and respectively outputs Pulse Width Modulation (PWM) signals to each power converter to control the work of each power converter. In partial centralized control, there is provided with a central controller and a plurality of local controllers, where one local controller controls one power converter, the central controller collects input signals and an output signal of each power converter, performs calculation and outputs intermediate control variables, and each local controller generates a PWM signal according to the intermediate control variable and an output signal of a corresponding power converter.

However, regardless of centralized control or partial centralized control, there is provided with a central controller control. If the central controller fails, the cascade converter cannot continue to work and the reliability is low.

SUMMARY

The present application provides a conversion system and a control method, which aims to solve the above problem in the prior art.

In the first aspect, the present application provides a conversion system, including:

N power converters, where each of the N power converters includes a first side and a second side, the first sides of the N power converters are electrically coupled in series, and currents flowing through the first sides of the N power converters are the same, and N controllers, corresponding to the N power converters one to one, and each of the N controllers includes:

a common-mode voltage loop, configured to receive a voltage reference signal and a voltage feedback signal, and output a given signal; and a current loop, configured to receive the given signal, a current reference signal and a first side current of a corresponding power converter, and output a common-mode control signal to modulate a first side voltage of the corresponding power converter, where $N \geq 2$, and N is an integer.

In a second aspect, the present application provides a control method for controlling a conversion system, where the conversion system includes:

N power converters, where each of the N power converters includes a first side and a second side, the first sides of the N power converters are electrically coupled in series, and currents flowing through the first sides of the N power converters are the same; and N controllers, corresponding to the N power converters one to one, where $N \geq 2$, and N is an integer, the control method includes:

S1, receiving, by each of the N controllers, a voltage reference signal, a voltage feedback signal, a current reference signal, and a first side current of a corresponding power converter;

S2, outputting, according to the voltage reference signal and the voltage feedback signal, a given signal; and S3, outputting, according to the given signal, the current reference signal and the first side current of the corresponding power converter, a common-mode control signal to modulate a first side voltage of the corresponding power converter.

The present application provides a conversion system and a control method, including N power converters and N controllers, where each power converter includes a first side and a second side, the first sides of the N power converters are electrically coupled in series, and currents flowing through the first sides of the N power converters are the same. The N controllers correspond to the N power converters one to one. A fully distributed control is adopted, and each power converter is provided with a corresponding controller. A common-mode control signal is generated by a common-mode voltage loop and a current loop in the controller to achieve a control of a first side voltage of a corresponding power converter by each controller without the need of providing a centralized controller. When part of the controllers fail, the other controllers can continue to work and the reliability is higher. In addition, there is no centralized controller, and modular design is realized, which is conducive to the expansion of the conversion system.

DESCRIPTION OF EMBODIMENTS

To describe the purposes, technical solutions and advantages of the present application more clearly, the technical solutions in the present application will be clearly and completely described below in combination with the accompanying drawings in the present application. Apparently, described embodiments are part of the embodiments of the present application, but not all of the embodiments. Based on the embodiments of the present application, all the other embodiments obtained by those of ordinary skill in the art without creative work belong to the protection scope of the present application.

A power electronic converter is a device that uses power electronic devices to convert electrical energy. A cascade conversion system includes a plurality of power electronic converters (hereinafter referred to as power converter) with input sides connected in series. Due to high modularity degree and good scalable performance of the cascade conversion system, it is widely used in power apparatuses, such as Electronic Power Transformers (EPT), Static Var Compensators (SVC) and medium and high voltage high-power inverters.

Figure 1:
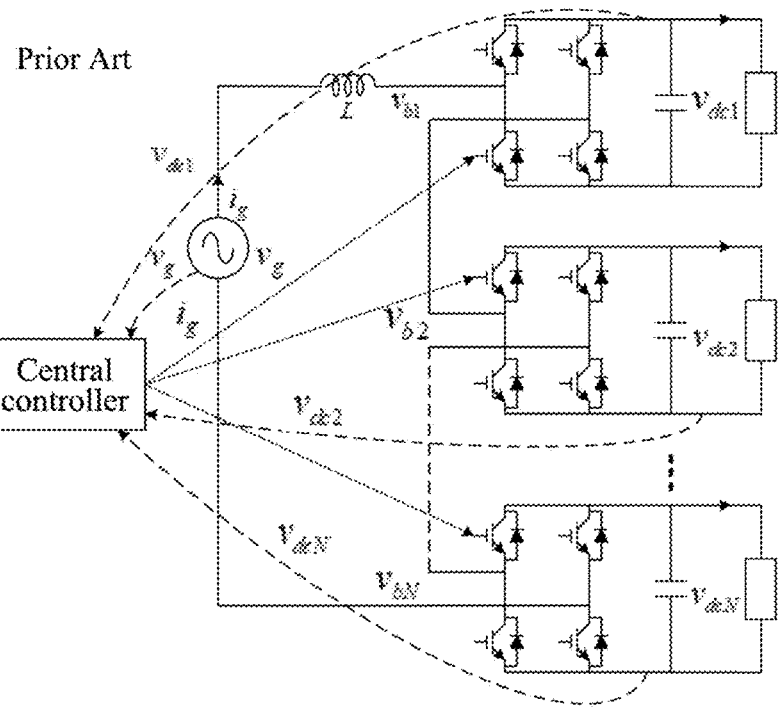
FIG. 1 is a schematic structure diagram of a cascade converter adopting centralized control in the prior art.
Figure 2:
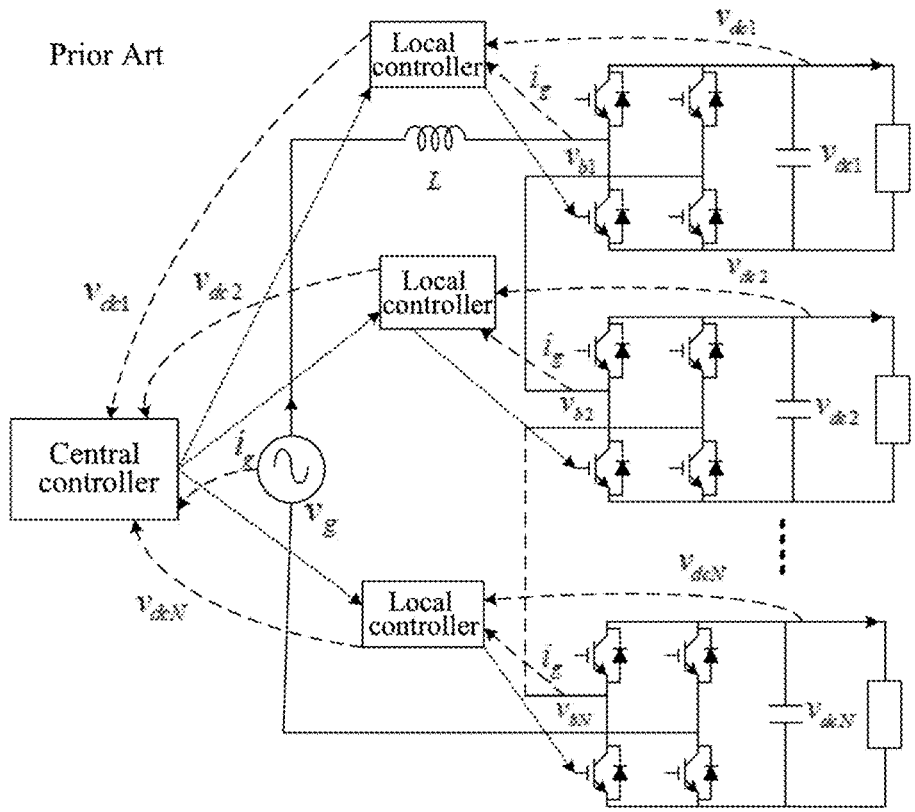
FIG. 2 is a schematic structure diagram of a cascade converter adopting partial centralized control in the prior art.

As shown in FIGS. 1 and 2, in the prior art, a cascade conversion system generally adopts centralized control or partial centralized control. In centralized control, a central controller collects input signals (an input voltage $v_g$ and an input current $i_g$) and an output signal ($v_{dc1}, v_{dc2}, \ldots, v_{dcn}$) of each power converter of the cascade conversion system, performs calculation and respectively outputs Pulse Width Modulation (PWM) signals to each power converter to modulate an input voltage ($v_{b1}, v_{b2}, \ldots, v_{bn}$) of each power converter. In partial centralized control, there is provided with a central controller and a plurality of local controllers, where one local controller controls one power converter, the central controller collects input signals and an output signal of each power converter, performs calculation and outputs intermediate control variables, and each local controller generates a PWM signal according to the intermediate control variable and an output signal of a corresponding power converter, and the PWM signal is used to control the work of each power converter.

However, regardless of centralized control or partial centralized control, there is provided with a central controller control. If the central controller fails, the cascade converter cannot continue to work and the reliability is low.

In order to solve the above problem in the prior art, the present application proposes a fully distributed conversion system and its control method. There is no need to use a centralized controller in the conversion system, and only a corresponding controller is configured for each power converter. Input currents of all converter units in a cascade converter system are the same and cannot be controlled independently of each other, which increases the difficulty of implementing distributed control in the cascade converter system. This is different from a converter parallel system. Coupling between converters in the converter parallel system is relatively small, currents of the converters can be different, and distributed control is easier to be implemented.

A conversion system according to a first embodiment of the present application includes N power converters and N controllers.

Each power converter includes a first side and a second side. The first sides of the N power converters are electrically coupled in series, and currents flowing through the first sides of the N power converters are the same. $\geqslant 2$, and N is a positive integer.

Figure 3A:
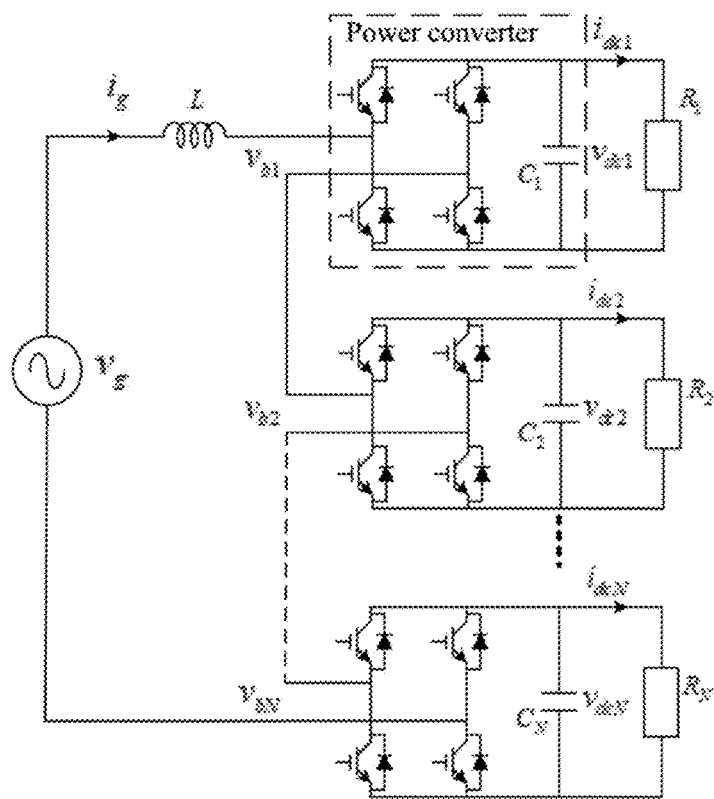
FIG. 3A is a schematic structure diagram of a main circuit according to a conversion system of the present application.

A main circuit of a cascade conversion system is shown in FIG. 3A. The cascade conversion system includes a plurality of power converters with input sides connected in series, and outputs of the power converter respectively connect with loads (shown as $R_1$ to $R_N$ in the Figure). Each power converter includes an H-bridge and a capacitor, the capacitor is connected in parallel with DC (Direct Current) sides of the H-bridge, AC side of the H-bridge is used as AC (Alternating Current) side of the power converter, and DC side of the H-bridge is used as DC side of the power converter. A port formed by midpoints of two bridge arms in the H-bridge is a first side of the power converter, and a port formed by parallel connection of the bridge arms and the capacitor is a second side of the power converter. When a cascade converter with this structure is configured to connect to an AC power supply, the first side of the power converter is used as an input side, and the second side of the power converter is used as an output side. When the cascade converter is configured to connect to a DC power supply, the first side of the power converter is used as an output side, and the second side of the power converter is used as an input side.

Figure 3B:
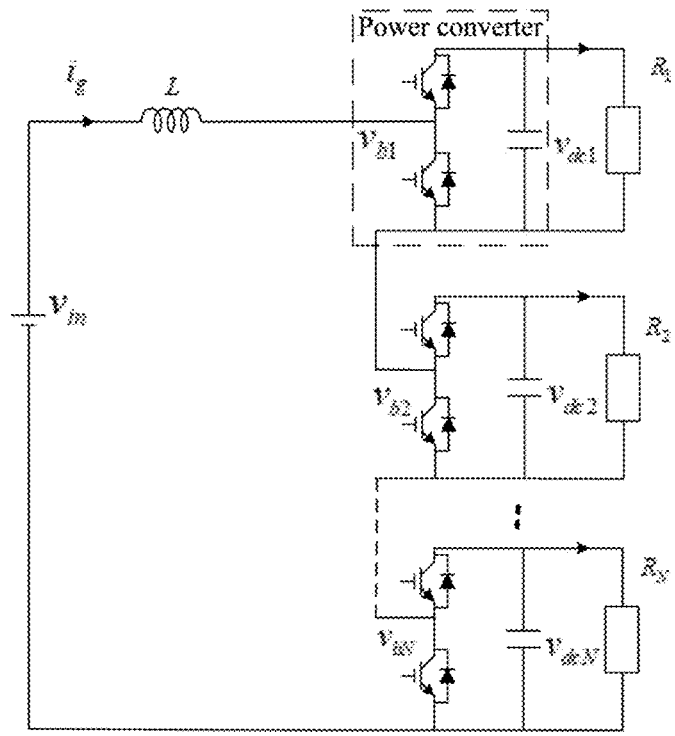
FIG. 3B is a schematic structure diagram of another main circuit according to a conversion system of the present application.

A main circuit of another cascade conversion system is shown in FIG. 3B. Each power converter includes a single bridge arm and a capacitor. The capacitor is connected in parallel with the bridge arm. A midpoint of the bridge arm and one end of the bridge arm form a first side of the power converter. Both ends of the bridge arm form a second side of the power converter. A cascade conversion system with this structure can only be configured to a DC power supply. When the first side of the power converter is used as an input side, the second side of the power converter is used as an output side. When the second side of the power converter is used as an input side, the first side of the power converter is used as an output side.

Figure 4:
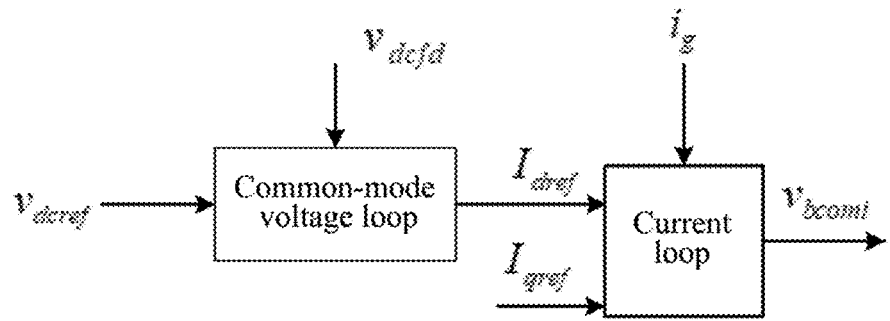
FIG. 4 is a schematic control principle diagram of a common-mode voltage loop and a current loop according to a first embodiment of the present application.

N controllers correspond to N power converters one to one, and each controller is configured to obtain a first side current and a second side voltage of a corresponding power converter. As shown in FIG. 4, each controller includes a common-mode voltage loop and a current loop. The common-mode voltage loop in the controller is configured to receive a voltage reference signal $v_{dcref}$ and a voltage feedback signal $v_{dcfd}$, and generate and output a given signal $I_{dref}$ according to the voltage reference signal $v_{dcref}$ and the voltage feedback signal $v_{dcfd}$. The current loop is configured to receive the given signal $I_{dref}$ output by the common-mode voltage loop, a current reference signal $I_{qref}$ and a first side current $i_g$ of the corresponding power converter, and generate and output a common-mode control signal $v_{bcomi}$ according to the given signal $I_{dref}$, the current reference signal $I_{qref}$ and the first side current $i_g$ of the corresponding power converter. The common-mode control signal $v_{bcomi}$ is used to modulate a first side voltage of the corresponding power converter.

The following describes a working principle of the conversion system according to the embodiment of the present application. Each controller receives a first side current of a corresponding power converter, and a common-mode voltage loop of each controller outputs a given signal according to a voltage reference signal and a voltage feedback signal, which are received, a current loop of each controller generates a common-mode control signal according to the given signal, a current reference signal, and a first side current of a corresponding power converter, which are received, so as to modulate a first side voltage of the corresponding power converter, and therefore, each controller controls a first side voltage of a corresponding power converter.

In the conversion system according to the embodiment of the present application, a fully distributed control is adopted, and each power converter is provided with a corresponding controller. A common-mode control signal is generated by a common-mode voltage loop and a current loop in the controller to achieve a control of a first side voltage of a corresponding power converter by each controller without the need of providing a centralized controller. When part of the controllers fail, the other controllers can continue to work and the reliability is higher.

A conversion system according to a second embodiment of the present application includes N power converters and N controllers. N controllers correspond to the N power converters one to one, and each controller is configured to obtain a first side current and a second side voltage of a corresponding power converter, and information is transmitted between the controllers to obtain second side voltages of other power converters.

Different from that in the first embodiment, N controllers include (N−1) controllers and a first controller, and N ≥ 3. A control principle of the first controller is different from those of the other (N−1) controllers. The principles of the other (N−1) controllers and the first controller are described respectively below.

Figure 5:
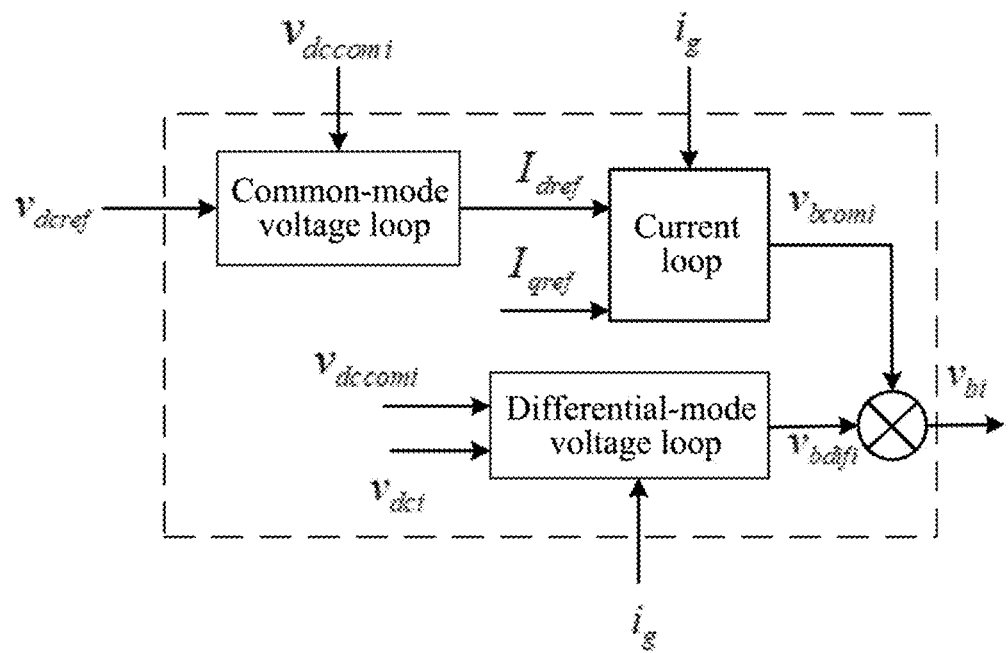
FIG. 5 is a schematic control principle diagram of a common-mode voltage loop and a current loop in (N–1) controllers according to a second embodiment of the present application.

As shown in FIG. 5, each of the (N−1) controllers not only include a common-mode voltage loop and a current loop, but also includes a calculation unit (not shown) and a differential-mode voltage loop.

The calculation unit is configured to receive a second side voltage of a corresponding power converter and a second side voltage of at least one other power converter, and take an average value of the second side voltage of the corresponding power converter and the second side voltage of at least one other power converter, and use the average value as the voltage feedback signal $v_{dccomi}$. The common-mode voltage loop generates a given signal $I_{dref}$ according to the voltage feedback signal $v_{dccomi}$ output by the calculation unit and a voltage reference signal $v_{dcref}$. The current loop generates a common-mode control signal $v_{bcomi}$ according to the given signal $I_{dref}$, a current reference signal $I_{qref}$ and a first side current $i_g$ of the corresponding power converter, which are received.

Calculation of the average value by the calculation unit can be divided into two situations. A first situation is that the calculation unit calculates an average value of second side voltages of all power converters to obtain the voltage feedback signal, and then can accurately control a first side voltage of the power converter according to the voltage feedback signal. The second situation is that each controller receives second side voltages that only reflect other M power converters in the conversion system, where $1 \leq M \leq (N-2)$, and M is an integer. The calculation unit only takes an average value of the second side voltage of the corresponding power converter and the second side voltages of the other M power converters in the conversion system, which can reduce communication between the controllers.

The differential-mode voltage loop receives the voltage feedback signal $v_{dccomi}$, the second side voltage $v_{dci}$ and the first side current $i_g$ of the corresponding power converter, and generates and outputs a differential-mode control signal $v_{bdifi}$ according to the voltage feedback signal $v_{dccomi}$, the second side voltage $v_{dci}$ and the first side current $i_g$ of the corresponding power converter. The differential-mode control signal $v_{bdifi}$ and the common-mode control signal $v_{bcomi}$ are superimposed to obtain a control instruction $v_{bi}$, which is used to modulate a first side voltage of the corresponding power converter.

Figure 6:
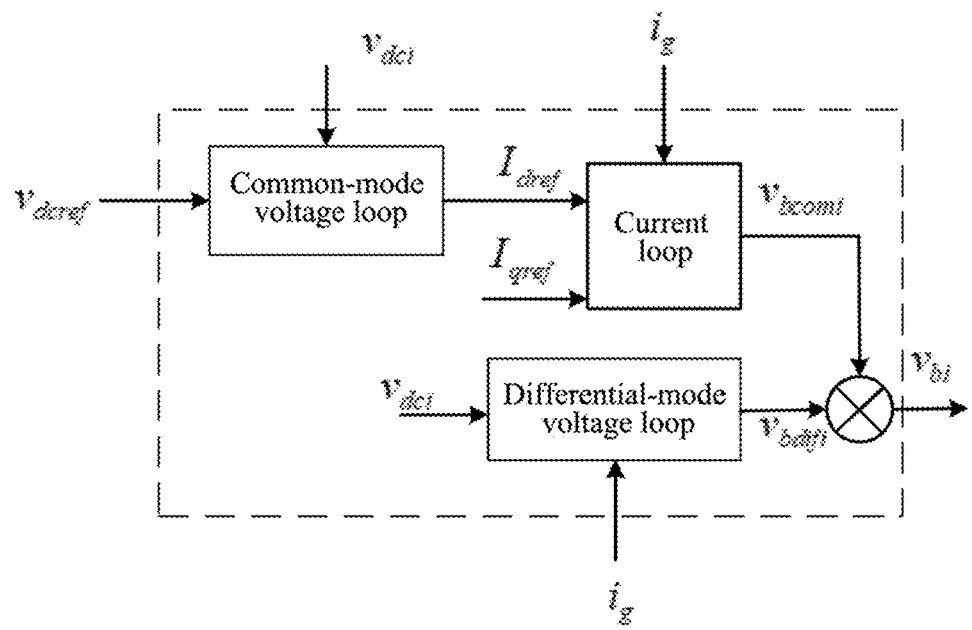
FIG. 6 is a schematic control principle diagram of a common-mode voltage loop and a current loop in a first controller according to the second embodiment of the present application.

As shown in FIG. 6, the first controller includes a differential-mode voltage loop in addition to a common-mode voltage loop and a current loop. The first controller uses a second side voltage $v_{dci}$ of a corresponding power converter as a voltage feedback signal. The common-mode voltage loop generates a given signal $I_{dref}$ according to the second side voltage $v_{dci}$ of the corresponding power converter and a voltage reference signal $v_{dcref}$. The current loop generates a common-mode control signal $v_{bcomi}$ according to the given signal $I_{dref}$, a current reference signal $I_{qref}$ and a first side current $i_g$ of the corresponding power converter, which are received. The differential-mode voltage loop receives the second side voltage $v_{dc}$, and the first side current $i_g$ of the corresponding power converter, and generates and outputs a differential-mode control signal $v_{bdifi}$ according to the second side voltage $v_{dci}$ and the first side current $i_g$ of the corresponding power converter. The differential-mode control signal $v_{bdifi}$ and the common-mode control signal $v_{bcomi}$ are superimposed to obtain a control instruction $v_{bi}$, which is used to modulate a first side voltage of the corresponding power converter.

Stability and voltage balance of the conversion system are analyzed respectively below.

Continuing to refer to FIG. 3A, each H-bridge is a power converter. In the figure, a first side of a power converter is used as an input side, and a second side of the power converter is used as the output side. $i_g$ is a grid current, that is, a first side current of the power converter, $v_g$ is a grid voltage, L is a filter inductor, $C_i$ is a DC-link capacitor of a i-th power converter, and $v_{dci}$ is a DC-link voltage of the i-th power converter, that is, a second side voltage of the i-th power converter, $v_{bi}$ is a bridge arm voltage of the i-th power converter, that is, a first side voltage of the i-th power converter, $i_{dsi}$ is a DC output current of the i-th power converter, that is, a second side current of the i-th power converter, $P_i$ is a DC-side output power of the i-th power converter, that is, a second side power of the i-th power converter.

When output powers, capacitor voltages and bridge arm voltages of the power converters are respectively the same, inputs of the power converters equally share the grid voltage.

According to a circuit, a unit power balance equation (1) can be obtained as follows:

$$\frac{dE_i}{dt} = v_{bi} i_g - P_i \quad (1)$$

where, $E_i$ is energy of the DC-link capacitor of the i-th power converter, $E_i = \frac{1}{2} C_i v_{dci}^2$, i=1, 2, ..., N.

Common-mode and differential-mode decompositions can be performed on the formula (1) as follows, and a common-mode power balance equation could be obtained by summing the above N equations and dividing by N $$\frac{dE_{com}}{dt} = v_{bcom} i_g - P_{com} \quad (2)$$

where, $E_{com} = \frac{1}{N} \sum_{i=1}^{N} \frac{1}{2} C_i v_{dci}^2$ is a DC-link average energy, $$v_{bcom} = \frac{1}{N} \sum_{i=1}^{N} v_{bi}$$

is a common-mode component of the bridge arm voltage, and $$P_{com} = \frac{1}{N} \sum_{i=1}^{N} P_i$$

is a common-mode component of the output power.

A differential-mode power balance equation (3) can be obtained as follows by subtracting the common-mode equation from the N equations in formula (1) respectively:

$$\frac{dE_{difi}}{dt} = v_{bdifi} i_g - P_{difi} \quad (3)$$

where, $E_{difi} = E_i - E_{com}$ is a DC-link differential-mode energy, $v_{bdifi} = v_{bi} - v_{bcom}$ is a differential-mode component of the first side voltage, and $P_{difi} = P_i - P_{com}$ is a differential-mode component of the output power.

A common-mode circuit equation including a grid-side current state is shown in the following equation (4):

$$\begin{cases} L \frac{di_g}{dt} = v_g - N v_{bcom} \\ \frac{dE_{com}}{dt} = v_{bcom} i_g - P_{com} \end{cases} \quad (4)$$

A prerequisite for the conversion system to work normally is that the above equations can reach a steady state, that is, a common-mode power absorbed by the bridge arm is balanced with an output common-mode power, and a differential-mode power absorbed by the bridge arm is balanced with an output differential-mode power.

According to the above equation (4), $v_{bcom}$ could be used to control the grid current, thereby controlling a total power or a common-mode power flowing into all power converters. According to the formula (3), it can be seen that $v_{bdifi}$ could be used to control the differential-mode power. Since the DC-link voltage reflects energy of the DC-link capacitor, a stable work of the circuit can be achieved through a closed-loop feedback control of the DC-link voltage.

Cascaded H-bridge uses power converters, which are connected in series, to deal with medium and high voltage situations. Voltage stress of each power converter device is determined by its respective DC-link voltage. In order to prevent a unit overvoltage, it is necessary to control N DC-link voltages to be consistent. This is a DC-link voltage-sharing problem, which is a main challenge of a cascaded H-bridge control. $v_{bdifi}$ could be used to control the differential-mode power and combined with a closed-loop feedback of the DC-link voltage to achieve a DC-link voltage balance. That is, the common-mode voltage loop and the current loop are configured to generate a common-mode control signal, and the differential-mode voltage loop is configured to generate a differential-mode control signal, and the common-mode control signal and the differential-mode control signal are superimposed to obtain a control instruction, and carrier phase shift modulation is performed on the control instruction to generate a control signal, and a DC-link voltage balance control could be achieved by controlling the power converter with the control signal. When the carrier phase shift modulation is performed on the control instruction to generate the control signal, a fully distributed control could be used to reduce a loading delay in each power converter, thereby increasing a control bandwidth.

In the conversion system according to the embodiment of the present application, the calculation unit of each controller calculates a voltage feedback signal, generates a corresponding differential-mode control signal according to the voltage feedback signal, and realizes a control of a first side voltage of a power converter in combination with a common-mode control signal, and the central controller does not need to collect second side voltages of all power converters to obtain common-mode voltage signals, so that the conversion system according to the embodiment of the present application can realize fully distributed control and improve a reliability of the conversion system. In addition, in a second situation of the embodiment, each controller only calculates a voltage feedback signal based on second side voltage signals of part of the power converters, without needing to obtain voltage signals of all the other power converters, which can greatly reduce the number of wires between controllers and the amount of data between controllers, thereby further improving the reliability of the conversion system.

A conversion system according to a third embodiment of the present application includes N power converters and N controllers. N controllers correspond to the N power converters one to one, and each controller is configured to obtain a first side current and a second side voltage of a corresponding power converter, and information is transmitted between the controllers to obtain second side voltages of other power converters.

Different from the second embodiment, the N controllers have a same control principle. An internal control block diagram of a controller could make reference to FIG. 5.

Each of the N controllers not only includes a common-mode voltage loop and a current loop, but also includes a calculation unit and a differential-mode voltage loop.

The calculation unit is configured to take an average value of a second side voltage of a corresponding power converter and a second side voltage of at least one other power converter, and use the average value as a voltage feedback signal. The voltage loop generates a given signal according to the voltage feedback signal output by the calculation unit and a voltage reference signal. The current loop generates a common-mode control signal according to the given signal, a current reference signal and a first side current of the corresponding power converter, which are received.

Correspondingly, calculation of the average value by the calculation unit can be divided into two situations. A first situation is that the calculation unit calculates an average value of second side voltages of all power converters to obtain the voltage feedback signal. The second situation is that the calculation unit only takes an average value of a second side voltage of a corresponding power converter and second side voltages of the other M power converters, where $1 \leq M \leq (N-2)$, is an integer, and $N \geq 3$.

The differential-mode voltage loop receives the voltage feedback signal, the second side voltage and the first side current of the corresponding power converter, and generates and outputs a differential-mode control signal according to the voltage feedback signal, the second side voltage and the first side current of the corresponding power converter. A superimposition of the differential-mode control signal and the common-mode control signal is used to modulate a first side voltage of the corresponding power converter.

In the conversion system according to the embodiment of the present application, the controllers have a same control principle, which is that a voltage feedback signal is obtained by calculating an average value of second side voltages of a corresponding power converter and other power converters, a corresponding differential-mode control signal is generated according to the voltage feedback signal, and realizes a control of a first side voltage of a power converter in combination with a common-mode control signal, which could improve an accuracy of voltage control.

The following describes the conversion system according to the fourth embodiment of the present application with reference to a specific information transmission structure between controllers. The information transmission structure between N controllers is a balanced graph, such as a unidirectional ring-type grid or a bidirectional ring-type grid. That is, a leaderless mode communication is adopted between the controllers. Each controller acts as a node in the balanced graph, and a first to N-th controllers correspond to nodes 1 to N respectively. For each node, the number of information flowing into the node is equal to the number of information flowing out of the node.

Figure 7:
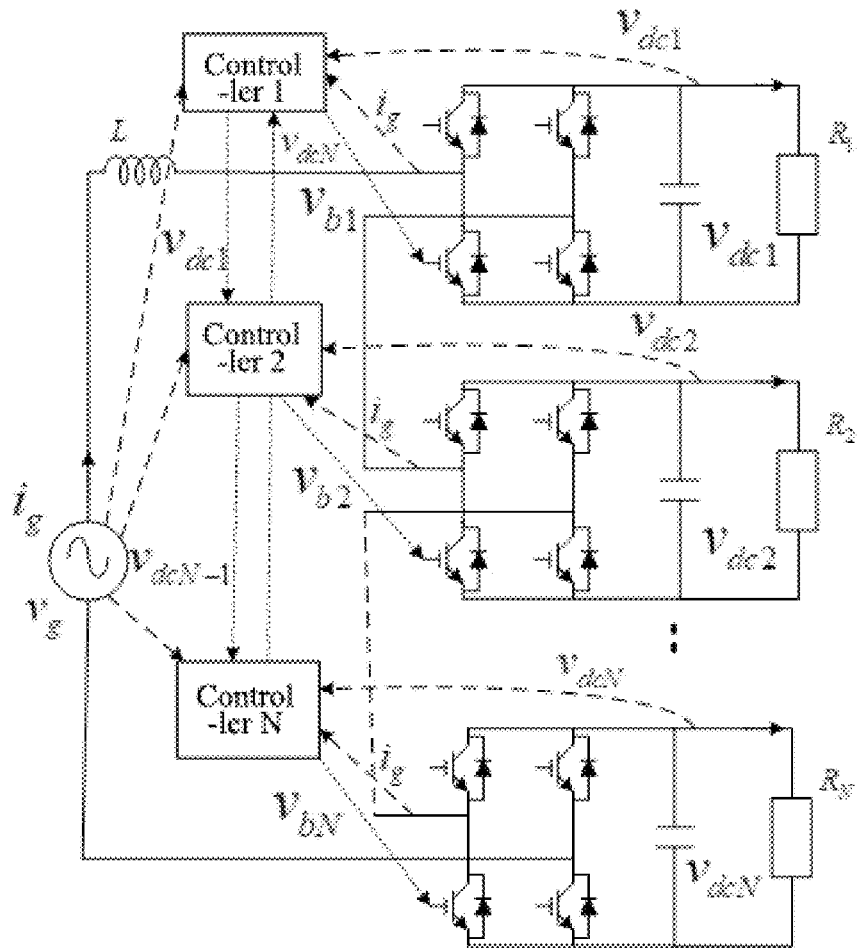
FIG. 7 is a schematic structural diagram of a conversion system with a unidirectional ring-type grid information transmission structure according to a fourth embodiment of the present application.

An information transmission structure between the N controllers in FIG. 7 is a unidirectional ring grid, and the N controllers are connected in sequence to form a ring. Signals between the controllers flow in a unidirectional direction. A node 1 receives a second side voltage of an N-th power converter sent by node N, and sends a second side voltage of a first power converter to node 2. A signal received by the node 1 only contains a voltage signal of the N-th power converter, and a signal sent only contains a voltage signal of the first power converter. Therefore, the numbers of information flowing into and out of the node 1 are both 1, so the node 1 is a balanced node, the rest may be inferred. Each node in the unidirectional ring-type grid is a balanced node.

Figure 8:
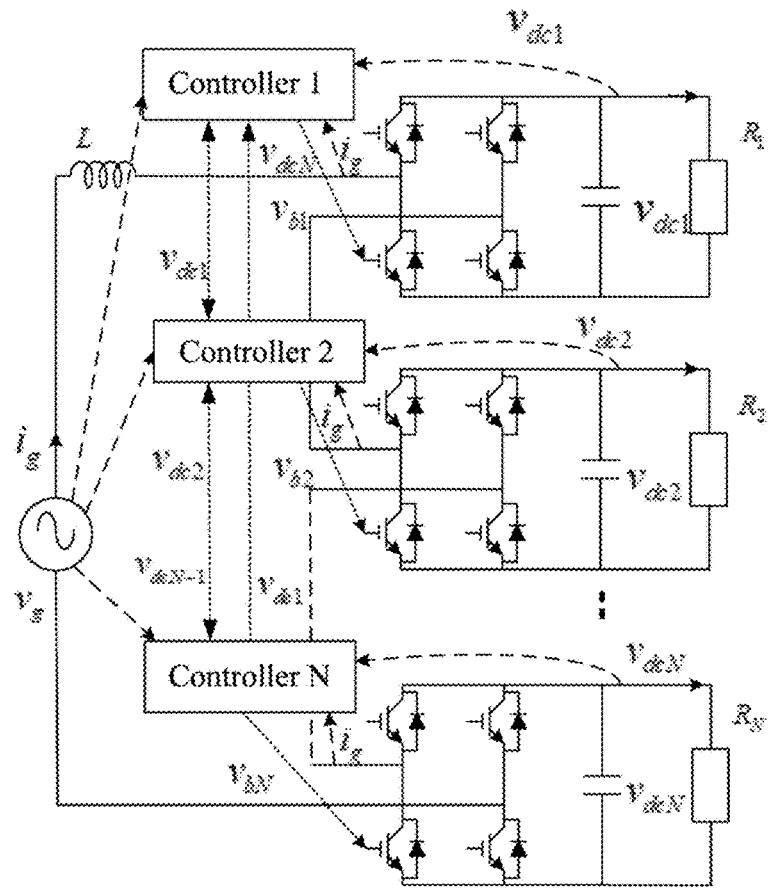
FIG. 8 is a schematic structural diagram of a conversion system with a bidirectional ring-type grid information transmission structure according to the fourth embodiment of the present application.

An information transmission structure between the N controllers in FIG. 8 is a bidirectional ring-type grid, and the N controllers are connected in sequence to form a ring. Signals between the controllers flow in bidirectional directions. Node 1 receives a second side voltage of a N-th power converter sent by node N and a second side voltage of a second power converter sent by node 2, and sends a second side voltage of a first power converter to the node 2 and node N. The numbers of information flowing into and out of the node 1 are both 2, and the node 1 is a balanced node, the rest may be inferred. Each node in the bidirectional ring grid is a balanced node.

Figure 9:
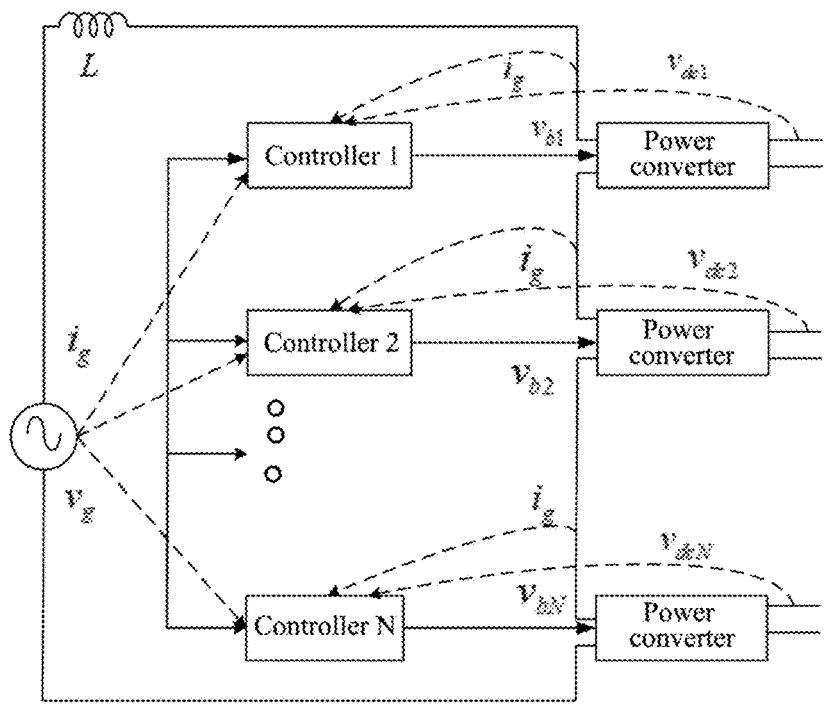
FIG. 9 is a schematic structural diagram of a conversion system with a star-shaped grid information transmission structure according to the fourth embodiment of the present application.

An information transmission structure between the N controllers in FIG. 9 is a star-shaped grid, each controller is connected to the other (N−1) controllers, and a signal flow direction between the connected controllers is bidirectional. A node 1 receives second side voltage signals sent by other (N−1) nodes, and sends its corresponding second side voltage signal to the other (N−1) nodes. The number of information flowing into and out of the node 1 is both (N−1) which is also a balanced graph.

It should be noted that the information transmission structure referred herein is not necessarily consistent with a hardware communication wiring diagram. The following takes a hardware wiring structure being a unidirectional ring-type grid as an example. Node N sends its own information to node 1, at same time, the node N forwards information sent by node N−1 to the node N to the node 1, then the number of information received by the node 1 is 2. At this time, the node 1 must also send its own information to two different nodes to form a balance graph. For example, one is sent to node 2 and another is forwarded to node 3 via the node 2. That is, when the hardware wiring structure is a unidirectional ring-type grid, a current node can receive second side voltages of power converters corresponding to all the other nodes, or only a second side voltage of a power converter corresponding to an adjacent node, which is not limited by a hardware wiring structure of the controllers.

When the information transmission structure between the N controllers is a balanced graph, each controller can receive second side voltages of other power converters, and receive a first side current and a second side voltage of a corresponding power converter. Each controller includes a calculation unit, a common-mode voltage loop, a current loop and a differential-mode voltage loop. The calculation unit calculates an average value of the second side voltages of other power converters and the second side voltage of a corresponding power converter to obtain a voltage feedback signal. The voltage feedback signal may be an average value of second side voltages of all power converters, or an average value of second side voltages of part power converters. The common-mode voltage loop, the current loop, and the differential-mode voltage loop are the same as those in the third embodiment, and will not be repeated here.

The following describes a process of calculating to obtain the voltage feedback signal in combination with the information transmission structure between the controllers.

The voltage feedback signal is calculated according to the following formula:

$$v_{dccomi} = \rho_i v_{dci} + \sum_{j \in Neb(i)} \rho_j v_{dcj} \quad (5)$$

where, $v_{dccomi}$ represents the voltage feedback signal, $Neb(i)$ represents a neighbor of node i, that is, a node corresponding to a voltage resolved from a voltage signal received by the node i, that is, if the node i receives information from node j, then the node j is referred to as the neighbor of the node i.

In formula (5), $\rho_i$ is a weighting coefficient, and $$\rho_i + \sum_{j \in Neb(i)} \rho_j = 1.$$

Preferably $$\rho_i = \rho_j = \frac{1}{N_i + 1},$$

and $N_i$ is the number of neighbors.

The following describes a process of calculating to obtain the voltage feedback signal (i.e. common-mode voltage) in combination with the information transmission structure between the controllers.

The information transmission structure between the N controllers is a unidirectional ring-type, that is, there is no root node among the nodes. If a nearest upstream node (i−1) of each node is a neighbor node, the voltage feedback signal is calculated according to the following formula:

$$v_{dccomi} = \frac{v_{dci} + v_{dc(i-1)}}{2} \quad (6)$$

The information transmission structure between the N controllers is a bidirectional ring-type, and nearest upstream node (i−1) and downstream node (i+1) of each node are neighbor nodes, then the voltage feedback signal is calculated according to the following formula:

$$v_{dccomi} = \frac{v_{dci} + v_{dc(i-1)} + v_{dc(i+1)}}{3} \quad (7)$$

The information transmission structure between the N controllers is a balanced graph, the hardware connection structure between the N controllers satisfies a star-shaped structure, and the other (N−1) nodes are all neighbors of node i, then the voltage feedback signal is calculated according to the following formula:

$$v_{dccomi} = \frac{1}{N} \sum_{i=1}^{N} v_{dci} \quad (8)$$

In the conversion system according to the embodiment of the present application, the information transmission structure between the N controllers is a balanced graph, and each controller can receive neighbor DC voltage signals that reflect voltages of other controllers, so as to receive enough voltage information of power converters to realize fully distributed control, while simplifying a connection relationship between the controllers.

The following describes a conversion system according to a fifth embodiment of the present application in combination with a specific information transmission structure between controllers. Different from the fourth embodiment, an information transmission structure between N controllers is a spanning tree. That is, a leader-follow mode communication is adopted between the controllers. Each controller acts as a node in the spanning tree, and a first to N-th controllers correspond to node 1 to node N respectively. In the spanning tree, all other nodes can be connected from a root node. The root node of the spanning tree is set as a leader node, and the other nodes are set as follower nodes.

When the information transmission structure between the N controllers is the spanning tree, the information transmission structure between the N controllers may be a chain type or a broadcast type.

Figure 10:
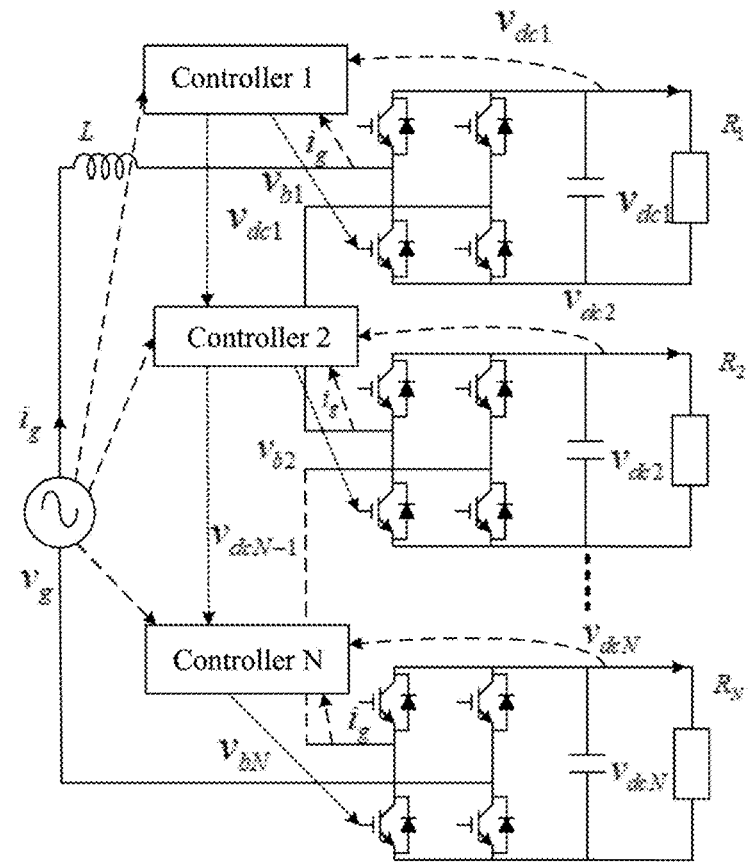
FIG. 10 is a schematic structural diagram of a conversion system with a chain spanning tree information transmission structure according to a fifth embodiment of the present application.

The information transmission structure between the N controllers in FIG. 10 satisfies a chain spanning tree, and the N controllers are connected in sequence and do not form a loop. Signals between the controllers flow in a unidirectional direction, that is, the signals flow from the root node to a downstream node. A first node with no signal flowing in is taken as the root node. Since no signal flows in, a controller corresponding to the root node only receives a first side current and a second side voltage of a corresponding power converter. Controllers corresponding to the other nodes can receive second side voltages of other power converters, and receive first side currents and second side voltages of the corresponding power converters. The second side voltages of other power converters can only reflect second side voltages of power converters corresponding to controllers of upstream nodes.

Figure 11:
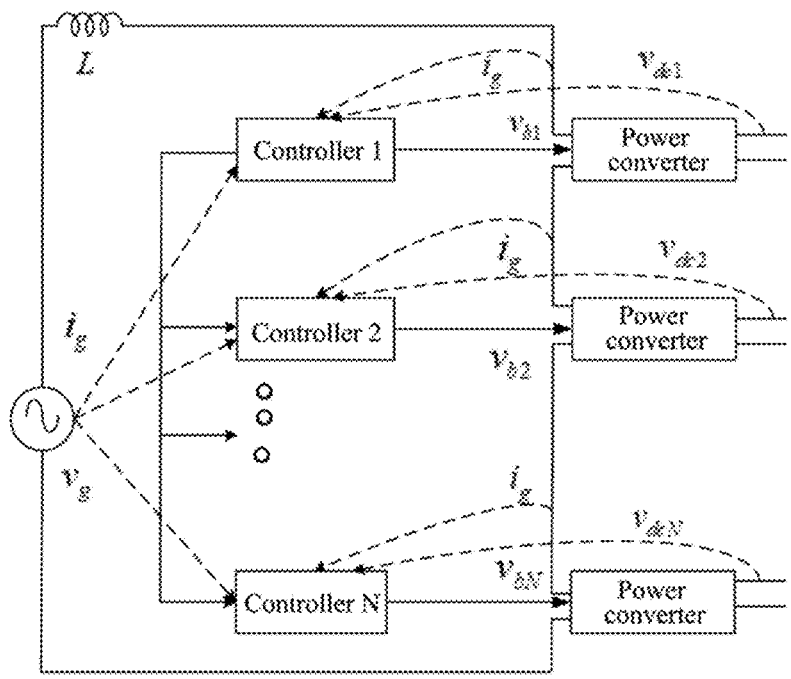
FIG. 11 is a schematic structural diagram of a conversion system with a broadcast spanning tree information transmission structure according to the fifth embodiment of the present application.

The information transmission structure between the N controllers in FIG. 11 is a broadcast spanning tree, the controller corresponding to the root node is connected to the other (N−1) controllers, and signal flow direction between the controller corresponding to the root node and other controllers is unidirectional. The controller corresponding to the root node only receives a first side current and a second side voltage of a corresponding power converter. Controllers corresponding to the other nodes can receive second side voltages of the other power converters and the first side currents and second side voltages of the corresponding power converters.

Correspondingly, the controller corresponding to the root node includes a common-mode voltage loop, a current loop, and a differential-mode voltage loop. The common-mode voltage loop, the current loop, and the differential-mode voltage loop are the same as those in the first controller in the second embodiment, and will not be repeated here. The controllers corresponding to the other nodes each includes a common-mode voltage loop, a current loop, a calculation unit and a differential-mode voltage loop. Functions of the common-mode voltage loops, current loops, calculation units, and differential-mode voltage loops are the same as those in the (N−1) controllers in the second embodiment, and will not be repeated here.

The following takes a transmission structure of the chain spanning tree and a transmission structure of the broadcast spanning tree as examples to illustrate a process of obtaining the voltage feedback signal.

In the transmission structure of the chain spanning tree, node 1 is a root node, and node 2 to node N are follower nodes. A nearest upstream node (i−1) of each follower node is a neighbor node. For the second to N-th controllers, the voltage feedback signal is calculated according to the following formula:

$$v_{dccomi} = \frac{v_{dci} + v_{dc(i-1)}}{2} \quad (9)$$

In the transmission structure of the broadcast spanning tree, the node 1 is the root node, and node 2 to node N is follower nodes. The node 1 is act as a neighbor node of the node 2 to node n. For the follower nodes, the voltage feedback signal is calculated according to the following formula:

$$v_{dccomi} = \frac{v_{dci} + v_{dc1}}{2} \quad (10)$$

In the conversion system according to the embodiments of the present application, the information transmission structure between N controllers is a spanning tree, and each node receives second side voltages of other power converters sent by upstream nodes, and then generates a feedback signal according to second side voltages of a corresponding power converter and other power converters, and then controls a first side voltage of the corresponding power converter according to the feedback signal to realize a fully distributed control, which can also reduce the amount of data transmission between the controllers and simplify a connection relationship between the controllers.

The following describes a conversion system according to a sixth embodiment of the present application. The system includes N power converters and N controllers.

On the basis of the second embodiment, the sixth embodiment respectively describes control principles of the differential-mode voltage loop and the common-mode voltage loop of each of the (N−1) controllers.

Figure 12:
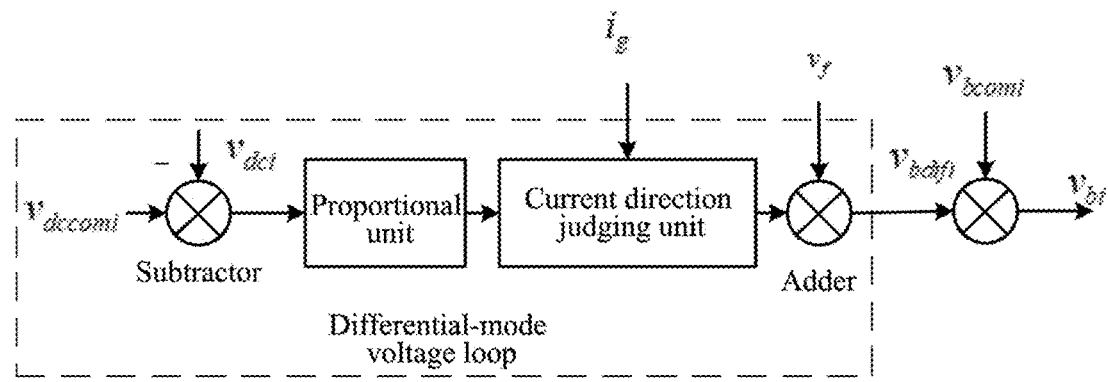
FIG. 12 is a schematic control principle diagram of a differential-mode voltage loop according to a sixth embodiment of the present application.

As shown in FIG. 12, the differential-mode voltage loop generates a differential-mode instruction $v_{bdifi}$ based on a voltage feedback signal $v_{dci}$, a second side voltage $v_{dci}$ and a first side current $i_g$ of a corresponding power converter. The differential-mode voltage loop specifically includes: a subtractor, a proportional unit, a current direction judging unit, and an adder.

The subtractor is configured to subtract the second side voltage $v_{dci}$ of the corresponding power converter from the voltage feedback signal $v_{dccomi}$ and obtain a first intermediate variable. The proportional unit is configured to multiply the first intermediate variable by a proportional coefficient $k_d$ and obtain a second intermediate variable. The current direction judging unit is configured to obtain an intermediate value according to a direction of the first side current $i_g$ of the corresponding power converter, and multiply the intermediate value by the second intermediate variable to obtain a third intermediate variable. The adder is configured to add the third intermediate variable and a differential-mode voltage feed-forward value $v_f$ of the corresponding power converter to obtain the differential-mode instruction.

It should be noted that the third intermediate variable can be directly output as the differential-mode instruction regardless of the differential-mode voltage feed-forward value.

The differential-mode voltage feed-forward value is calculated according to a differential-mode power on a DC side (a second side) and a current amplitude of an AC side (a first side), and the differential-mode voltage feed-forward value is specifically calculated according to the following formula:

$$v_f = i_{dcdifi} \frac{2v_{dccomi}}{I_{gM}} \quad (11)$$

where, $v_f$ represents the differential-mode voltage feed-forward value, $i_{dcdifi}$ represents a differential-mode component of a current of a DC-link capacitor, $i_{dcdifi} = i_{dci} - i_{dccomi}$, $i_{dci}$ represents a DC output current of an i-th power converter, $i_{dccomi}$ is a common-mode DC output current, and its calculation method is the same a common-mode voltage, and $I_{gM}$ represents a current amplitude of the first side of a corresponding power converter.

The current direction judging unit obtains the intermediate value according to the following formula:

$$\text{sign}(i_g) = \begin{cases} 1; & i_g > 0 \\ 0; & i_g = 0 \\ -1; & i_g < 0 \end{cases} \quad (12)$$

The current direction judging unit obtains the third intermediate variable according to the following formula:

$$v_Z = k_d v_{dcdifi} \text{sign}(i_g) \quad (13)$$

where, $v_Z$ represents the third intermediate variable, $v_{dcdifi} = v_{dci} - v_{dccomi}$, $v_{dcdifi}$ represents a differential-mode component of a voltage of a DC-link capacitor in the i-th power converter, and $k_d$ represents the proportional coefficient.

The differential mode voltage loop is an important part of the controller, which involves a voltage balance of the DC-link capacitors in the converter system. The following takes a leaderless mode of a unidirectional ring-type communication as an example to illustrate a design method of a proportional control parameter in the differential mode voltage loop.

Firstly, a voltage-sharing mathematical model is established $$\frac{d}{dt}v_{dc} = -L_{LL}v_{dc}e^{-s\tau} \tag{14}$$

$$L_{LL} = \frac{\alpha k_d}{2}\begin{bmatrix} 1 & 0 & \cdots & -1 \\ -1 & 1 & \cdots & 0 \\ 0 & \cdots & \cdots & 0 \\ 0 & 0 & -1 & 1 \end{bmatrix} \tag{15}$$

$$\alpha = \frac{2}{\pi}\frac{I_{gM}}{Cv_{dc0}} \tag{16}$$

where, $L_{LL}$ is a Laplace matrix, which is related to a communication architecture between controllers, $I_{gM}$ is a current amplitude of an AC side, $v_{dc0}$ is a voltage rating of a DC-link capacitor, and C is a capacitance of the DC-link capacitor.

Then, an eigenvalue of the Laplace matrix is obtained as follows:

$$\lambda_k(L_{LL}) = \frac{\alpha k_d}{2}\left(1 - e^{j\frac{2\pi}{N}i}\right), \quad k = 1, 2, \ldots, N \tag{17}$$

Stability of a voltage-sharing loop of the conversion system is equivalent to stability of a unit negative feedback coefficient corresponding to the following N open-loop transfer functions.

$$G(s) = \lambda_k(L_{LL})\frac{e^{-s\tau}}{s} \tag{18}$$

Therefore, a stability range of the proportional coefficient $k_d$ is as follows:

$$0 < k_d < \frac{\frac{\pi}{N}}{\sin\frac{\pi}{N}}\frac{1}{\alpha\tau} \tag{19}$$

where, $k_d$ represents the proportional coefficient, $\tau$ represents a communication time interval, $$\alpha = \frac{2}{\pi}\frac{I_{gM}}{Cv_{dc0}},$$

$I_{gM}$ represents a current amplitude of the first side of a corresponding power converter, $v_{dc0}$ represents a rated value of the second side voltage of the corresponding power converter, and C represents a capacitance of a capacitor in the corresponding power converter. Preferably, $$k_d = \frac{1}{4\alpha\tau}.$$

It can be seen from the above formula that the greater a communication delay, the narrower the stability range, and the more the number of power converters, the narrower the stability range, but the change is not obvious as the number of power converters increases. Value of $k_d$ should be in a stability range, which is specifically designed by a compromise between dynamic response speed and stability.

Figure 13:
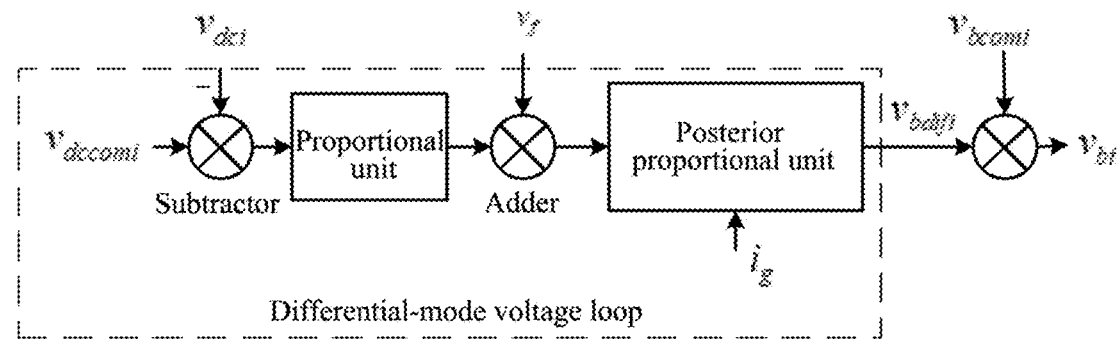
FIG. 13 is another schematic control principle diagram of a differential-mode voltage loop according to the sixth embodiment of the present application.

As shown in FIG. 13, the differential-mode voltage loop can also adopt the following control principle: a subtractor subtracts a second side voltage $v_{dci}$ of a corresponding power converter from a voltage feedback signal $v_{dccomi}$ and obtain a first intermediate variable. A proportional unit multiplies the first intermediate variable by a proportional coefficient and obtain a second intermediate variable. After an adder adds the second intermediate variable and a differential-mode voltage feed-forward value $v_f$ of the corresponding power converter, the added result passes through a posterior proportional unit to obtain a differential-mode instruction. The differential-mode voltage feed-forward value $v_f$ can be calculated according to the formula (11). A proportional coefficient of the posterior proportional unit changes with a first side current of the power converter, which is specifically represented by formula (20):

$$k_t = \frac{0.5 I_{gM}}{i_g} \tag{20}$$

where, $k_t$ represents the proportional coefficient of the posterior proportional unit.

Figure 14:
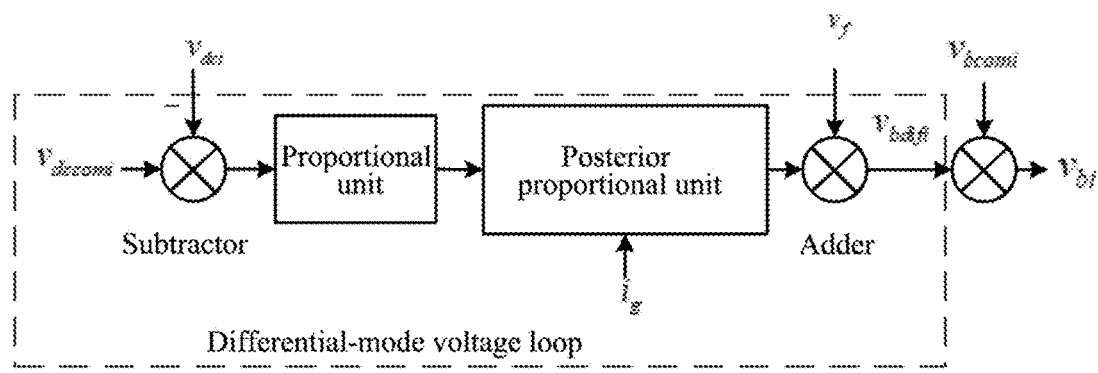
FIG. 14 is another schematic control principle diagram of a differential-mode voltage loop according to the sixth embodiment of the present application.

As a solution, as shown in FIG. 14, the differential-mode voltage loop may also adopt the following control principle: a subtractor subtracts a second side voltage $v_{dci}$ of a corresponding power converter from a voltage feedback signal $v_{dccomi}$ and obtain a first intermediate variable. A proportional unit multiplies the first intermediate variable by a proportional coefficient and obtain a second intermediate variable. After the second intermediate variable passes through the subsequent proportional unit again, it is added with a differential-mode voltage feed-forward value $v_f$ of the corresponding power converter to obtain a differential-mode instruction. A proportional coefficient of a posterior proportional unit is determined according to formula (20).

The differential-mode voltage feed-forward value $v_f$ shown in FIG. 14 can be calculated according to the following formula (21).

$$v_f = i_{dcdigi}\frac{v_{dccomi}}{i_g} \tag{21}$$

Figure 15:
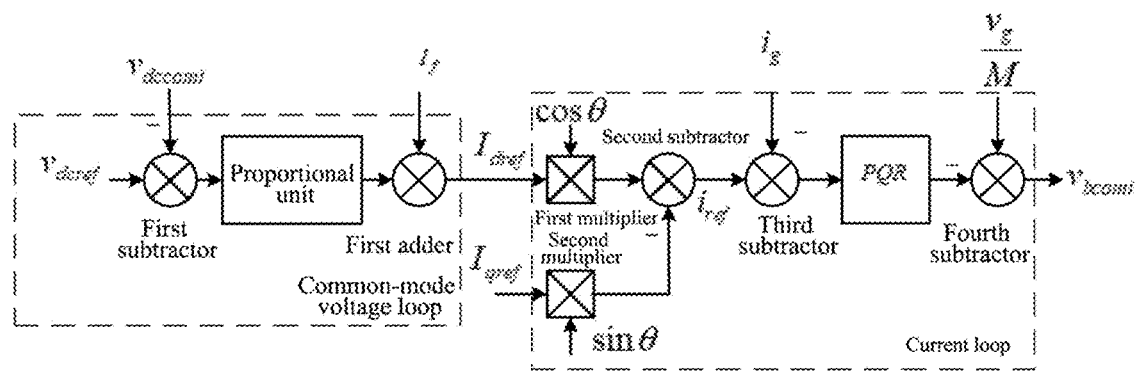
FIG. 15 is a schematic control principle diagram of a common-mode voltage loop and a current loop according to the second embodiment of the present application.

As shown in FIG. 15, a common-mode voltage loop generates a given signal $I_{dref}$ according to a voltage feedback signal $v_{dccomi}$ output by a calculation unit, a voltage reference signal $v_{dcref}$, and an active current feed-forward value $I_f$ of a first side of a corresponding power converter. The given signal is generated according to the active current feed-forward value, which can improve a dynamic response when a load changes suddenly.

The common-mode voltage loop includes a first subtractor, a proportional unit and a first adder. The first subtractor is configured to subtract the voltage reference signal $v_{dccomi}$ from the voltage feedback signal $v_{dcref}$ to obtain a fourth intermediate variable. The proportional unit is configured to proportionally control the fourth intermediate variable to obtain a fifth intermediate variable. The first adder is configured to add the fifth intermediate variable and the active current feed-forward value $I_f$ of the corresponding power converter to obtain the given signal $I_{dref}$.

The current loop includes a first multiplier, a second multiplier, a second subtractor, a third subtractor, a fourth subtractor, and a proportional quasi-resonant controller. The first multiplier is configured to multiply the given signal $I_{dref}$ and a cosine of a phase of a grid voltage to obtain a sixth intermediate variable. The second multiplier is configured to multiply a preset current reference value $I_{qref}$ and a sine of the phase of the grid voltage to obtain a seventh intermediate variable. The second subtractor is configured to subtract the seventh intermediate variable from the sixth intermediate variable to obtain an eighth intermediate variable $i_{ref}$. The third subtractor is configured to subtract the eighth intermediate variable from a first side current $i_g$ of the corresponding power converter to obtain a ninth intermediate variable. The proportional quasi-resonant controller is configured to perform proportional quasi-resonant control on the ninth intermediate variable to obtain a tenth intermediate variable. The fourth subtractor is further configured to subtract the tenth intermediate variable from a grid voltage feed-forward value $$\frac{v_g}{M}$$

to obtain a common-mode instruction $v_{bcomi}$.

Since each controller uses a current loop, and there is only one current in a circuit, it is impossible that all controllers can achieve static-free control. Therefore, the current loop adopts a Proportional Quasi-Resonant controller (PQR).

An active current feed-forward value at a first side of a power converter is obtained according to an average power of the DC side (a second side) of the power converter and a voltage amplitude of the AC side (a first side), that is, the active current feed-forward value is calculated according to the following formula (22).

$$I_f = i_{dccomi} \frac{2v_{dci}}{v_{gM}} \quad (22)$$

where, $I_f$ represents the active current feed-forward value, $i_{dccomi}$ represents a common-mode component of a current of a DC-link capacitor, $v_{dci}$ represents a voltage of a DC-link capacitor, and $v_{gM}$ represents an amplitude of an AC voltage provided by a power grid.

The grid voltage feed-forward value is calculated according to the following formula:

$$v_{fg} = \frac{v_g}{M} \quad (23)$$

where, M represents the number of DC voltages received from neighbors, and $v_g$ represents the AC voltage provided by the power grid.

Figure 22:
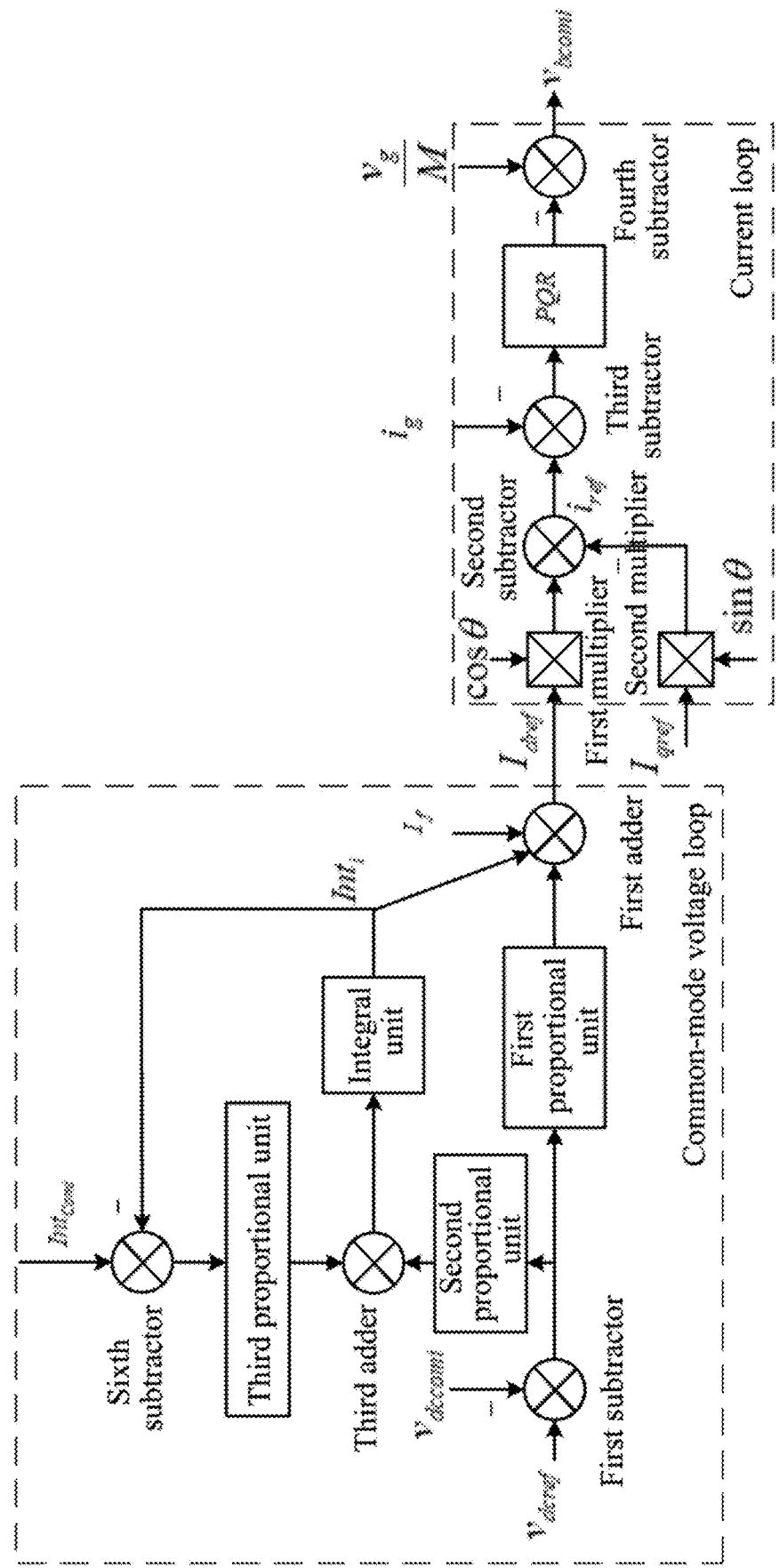
FIG. 22 is a schematic diagram of part of a control principle of another instruction generating unit according to the fifth embodiment of the present application.

As shown in FIG. 22, in an embodiment, a coordinated integration part may be added to the common-mode voltage loop shown in FIG. 15. More specifically, the common-mode voltage loop generates the given signal $I_{dref}$ based on the voltage feedback signal $v_{dccomi}$, the voltage reference signal $v_{dref}$, a local integral signal, and the active current feed-forward value of the corresponding power converter. The current loop is configured to generate the common-mode instruction $v_{bcomi}$ according to the preset current reference value $I_{qref}$, the given signal $I_{dref}$ and the first side current $i_g$ of the corresponding power converter.

The common-mode voltage loop includes the first subtractor, a first proportional unit, a second proportional unit, a sixth subtractor, a third proportional unit, the first adder, a third adder, and an integral unit. The first subtractor is configured to subtract the voltage feedback signal $v_{dccomi}$ from the voltage reference signal $v_{dcref}$ to obtain a fourth intermediate variable. The first proportional unit is configured to perform proportional control on the fourth intermediate variable according to a first proportional coefficient to obtain a fifth intermediate variable. The second proportional unit is configured to perform proportional control on the fourth intermediate variable according to a second proportional coefficient to obtain an eleventh intermediate variable. The sixth subtractor is configured to subtract a local integral signal $Int_i$ from a partial common-mode integral signal $Int_{comi}$ to obtain an integral error. The third proportional unit is configured to perform proportional control on the integral error according to a third proportional coefficient to obtain a twelfth intermediate variable. The third adder is configured to add the twelfth intermediate variable and the eleventh intermediate variable to obtain a thirteenth intermediate variable. The integral unit is perform integral control on the thirteenth intermediate variable to obtain the local integral signal $Int_i$. The first adder is configured to add the fifth intermediate variable, an active current feed-forward value of the corresponding power converter, and the local integrated signal to obtain the given signal.

The partial common-mode integral signal is obtained by performing weighted-average on the local integral signal generated by common-mode voltage loops in the other M controllers and the local integral signal generated by a common-mode voltage loop in a current controller, the other M controllers are neighbor controllers of the current controller.

The structure of the current loop is the same as the common-mode voltage loop shown in FIG. 15, and will not be repeated here.

By adding the coordinated integration part to the common-mode voltage loop, a steady-state error of the common-mode voltage loop can be eliminated, thereby improving the control accuracy of the controller and improving the performance of the conversion system.

The following takes different transmission structures as examples to illustrate a process of obtaining the partial common-mode integral signal.

In the transmission structure of a chain spanning tree, node 1 is a root node, and node 2 to node N are follower nodes. A nearest upstream node (i−1) of each follower node is a neighbor node. For the second to N-th controllers, the partial common-mode integral signal is calculated according to the following formula:

$$Int_{comi} = \frac{Int_i + Int_{(i-1)}}{2} \quad (24)$$

In the transmission structure of a broadcast spanning tree, the node 1 is the root node, and node 2 to node N is follower nodes. The node 1 is act as a neighbor node of the node 2 to node n. For the follower nodes, the partial common-mode integral signal is calculated according to the following formula:

$$Int_{comi} = \frac{Int_i + Int_1}{2} \quad (25)$$

In a transmission structure of a balanced graph with a unidirectional ring-type, there is no root node among the nodes. If a nearest upstream node (i−1) of node i is a neighbor node, the partial common-mode integral signal for the node 2 to node N is calculated according to the following formula:

$$Int_{comi} = \frac{Int_i + Int_{(i-1)}}{2} \quad (26)$$

The node 1 calculates the partial common-mode integral signal according to the following formula:

$$Int_{com1} = \frac{Int_N + Int_1}{2} \quad (27)$$

In the transmission structure of the balanced graph, the information transmission structure between the N controllers is a bidirectional ring-type, and nearest upstream node (i−1) and downstream node (i+1) of each node are neighbor nodes, then each node calculates the partial common-mode integral signal according to the following formula:

$$Int_{comi} = \frac{Int_{(i+1)} + Int_i + Int_{(i-1)}}{3} \quad (28)$$

The transmission structure between the N controllers is a balanced graph, the hardware connection structure between the N controllers satisfies a star-shaped structure, and the other (N−1) nodes are all neighbors of node i, then the partial common-mode integral signal is calculated according to the following formula:

$$Int_{comi} = \frac{1}{N}\sum_{i=1}^{N} Int_i \quad (29)$$

In the conversion system according to the embodiment of the present application, in order to solve the problem that a current of each converter cannot be controlled independently and freely, on the one hand, the common-mode voltage loop uses an average voltage value, rather than a voltage of each converter itself, rather than a voltage of each converter itself, as the feedback signal. This makes outputs of the common-mode voltage loops basically the same to a certain extent. On the other hand, the current loop uses controllers with static errors, such as a proportional controller, a proportional quasi-resonant controller, or the like, rather than a proportional integral controller and a proportional resonance controller, or the like, that completely eliminate static errors, which allows a certain error in current setting and current feedback, so that the current control of the converters will not conflict when outputs of common-mode voltage loops of the converters are slightly different.

Figure 16:
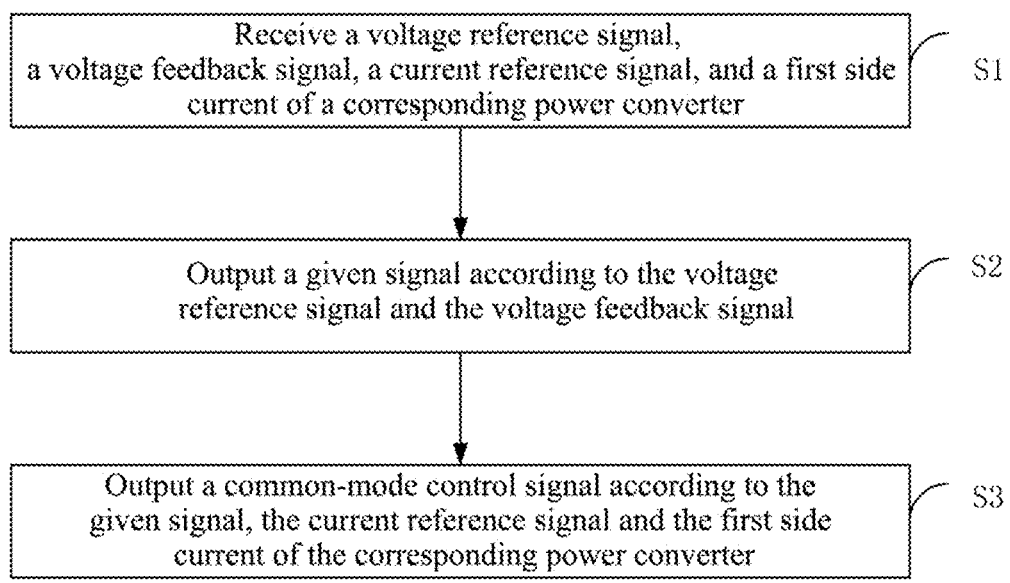
FIG. 16 is a schematic flowchart of a control method according to a seventh embodiment of the present application.

As shown in FIG. 16, a seventh embodiment of the present application further provides a control method for controlling a conversion system, where a structure of the conversion system is described with reference to the first embodiment. The control method includes:

S1, each of the N controllers receives a voltage reference signal, a voltage feedback signal, a current reference signal, and a first side current of a corresponding power converter.

The voltage feedback signal is generated according to a second side voltage of the power converter, and the voltage reference signal and the current reference signal are determined according to actual control requirements, that is, they are preset.

S2, outputting a given signal according to the voltage reference signal and the voltage feedback signal.

A specific process of obtaining the given signal includes: obtaining a difference between the voltage reference signal and the voltage feedback signal, and performing a proportional control on the difference between the voltage reference signal and the voltage feedback signal to obtain the given signal.

S3, outputting a common-mode control signal according to the given signal, the current reference signal and the first side current of the corresponding power converter.

The given signal and the current reference signal are processed to obtain a current intermediate value, and then the common-mode control signal is output according to the current intermediate value and the first side current of the corresponding power converter. The common-mode control signal is used to modulate a first side voltage of the corresponding power converter.

An eighth embodiment of the present application further provides a control method for controlling a conversion system, where a structure of the conversion control system is described with reference to the above embodiment. The control method includes:

S0, a controller calculates and obtain a voltage feedback signal.

A process of calculating the voltage feedback signal is described in two situations. In a first situation, one controller of N controllers cannot receive second side voltages of other power converters. This controller is marked as a first controller and the other controllers as (N−1) controllers.

Each of the (N−1) controllers take an average value of a second side voltage of a corresponding power converter and a second side voltage of at least one other power converter to obtain the voltage feedback signal. Preferably, when N ⩾ 3, each of the (N−1) controllers only takes an average value of the second side voltage of the corresponding power converter and second side voltages of other M power converters, where, $1 \leq M \leq (N-2)$, M is an integer.

The first controller receives a second side voltage of a corresponding power converter as the voltage feedback signal.

In a second situation, all of the N controllers can receive second side voltages of the other power converters, and each of the N controllers takes an average value of a second side voltage of a corresponding power converter and a second side voltage of at least one other power converter to obtain the voltage feedback signal.

The control method further includes S4, the controller generates a differential-mode control signal.

With respect to the two situations in step S0, a process of generating the differential-mode control signal will be explained accordingly.

With respect to the first situation, each of the (N−1) controllers outputs the differential-mode control signal according to the voltage feedback signal, the second side voltage and the first side current of the corresponding power converter. The first controller outputs the differential-mode control signal according to the second side voltage and the first side current of the corresponding power converter.

With respect to the second situation, each controller outputs the differential-mode control signal according to the voltage feedback signal, the second side voltage and the first side current of the corresponding power converter.

The differential-mode control signal and the common-mode control signal are superimposed and modulated to obtain a control instruction, and the control instruction is used to modulate the first side voltage of the corresponding power converter.

In an embodiment, S2 specifically includes the following steps: subtracting the partial common-mode signal from the preset voltage reference signal to obtain a fourth intermediate variable; performing proportional control on the fourth intermediate variable according to a first proportional coefficient to obtain a fifth intermediate variable; performing proportional control on the fourth intermediate variable according to a second proportional coefficient to obtain an eleventh intermediate variable; subtracting a local integral signal from a partial common-mode integral signal to obtain an integral error; performing proportional control on the integral error according to a third proportional coefficient to obtain a twelfth intermediate variable; adding the twelfth intermediate variable and the eleventh intermediate variable to obtain a thirteenth intermediate variable; performing integral control on the thirteenth intermediate variable to obtain the local integral signal; and adding the fifth intermediate variable, an active current feed-forward value of the corresponding power converter, and the local integrated signal to obtain the given signal $I_{dref}$. The partial common-mode integral signal is obtained by performing weighted-average on the local integral signal generated by common-mode voltage loops in the other M controllers and the local integral signal generated by a common-mode voltage loop in a current controller, the other M controllers are neighbor controllers of the current controller.

The following describes beneficial effects of the conversion system and the control method according to the embodiments of the present application in combination with specific embodiments.

Figure 17:
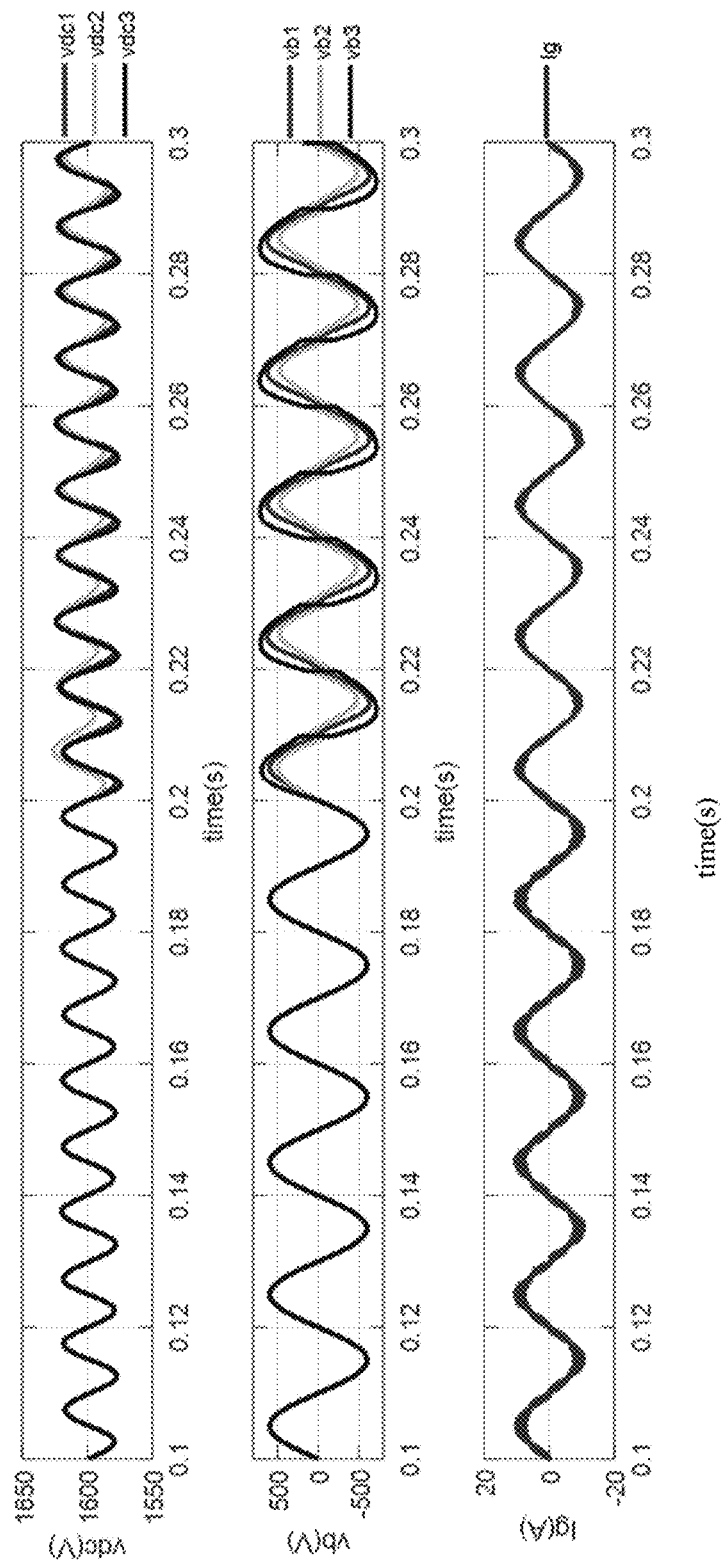
FIG. 17 is a schematic diagram of bridge arm voltages, voltages of a DC-link capacitor, and first side currents of each power converter in a conversion system according to the present application.
Figure 18:
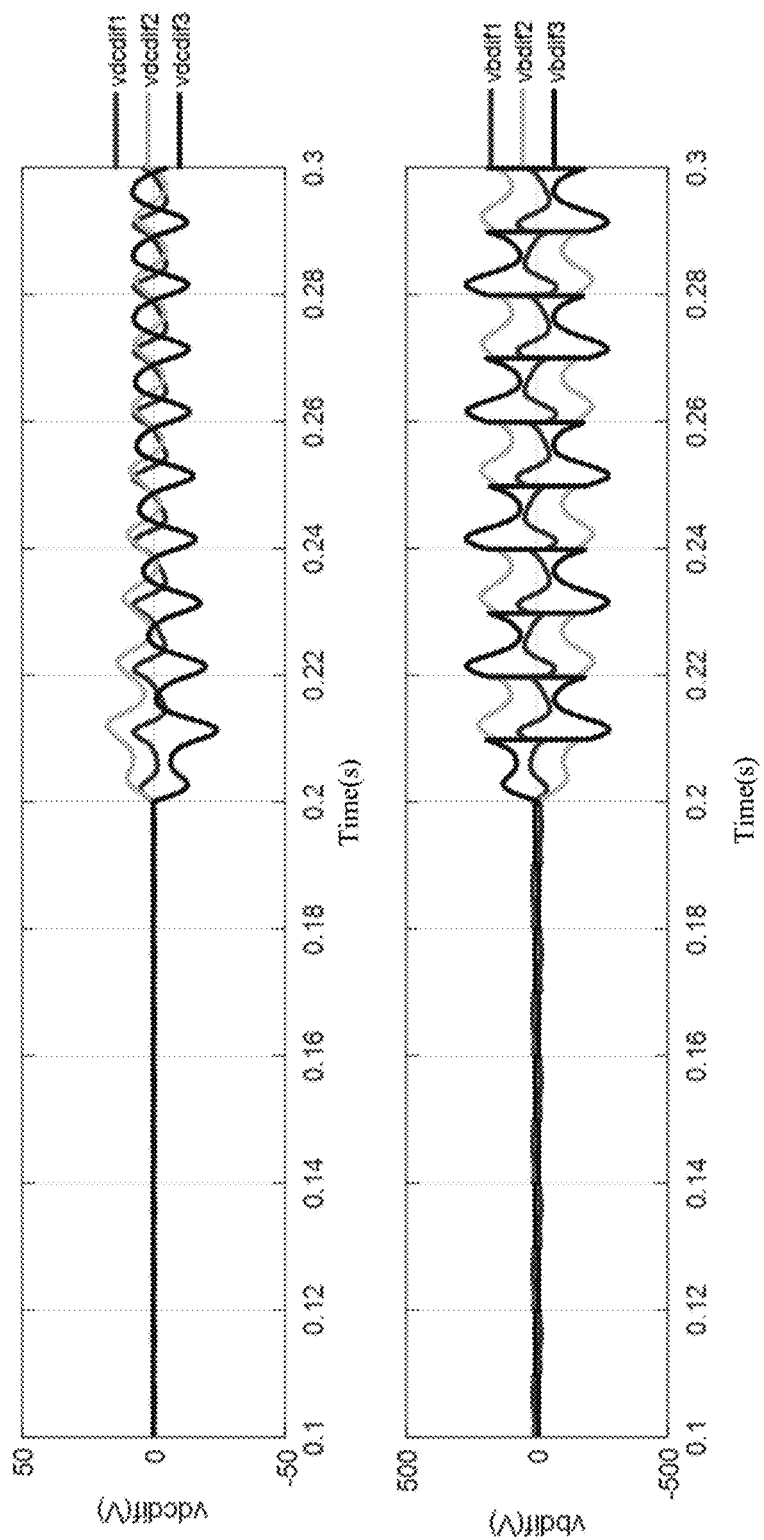
FIG. 18 is a schematic diagram of a differential-mode component of bridge arm voltages and a differential-mode component of voltages of a DC-link capacitor of each power converter in a conversion system according to the present application.

Taking an information transmission structure being a unidirectional ring-type grid as an example, three power converters are cascaded. As shown in FIGS. 17 and 18, before 0.2 s, load current of each power converter is 3 A. After 0.2 s, a load current of a second power converter changes to 2 A, and a load current of a third power converter changes to 4 A. Simulated waveforms of a DC-link capacitor voltage (a second side voltage of a power converter), a bridge arm voltage (a first side voltage of the power converter), and a grid current (a first side current of the power converter) are shown in FIG. 17. The waveform of the bridge arm voltage and the DC-link capacitor voltage and current satisfy a relationship corresponding to a differential-mode control equation. For example, in a time period between 0.2 s and 0.21 s, a current sign is positive, and differential-mode components of the bridge arm voltage and the DC link capacitor voltage satisfy a proportional relationship.

Figure 19:
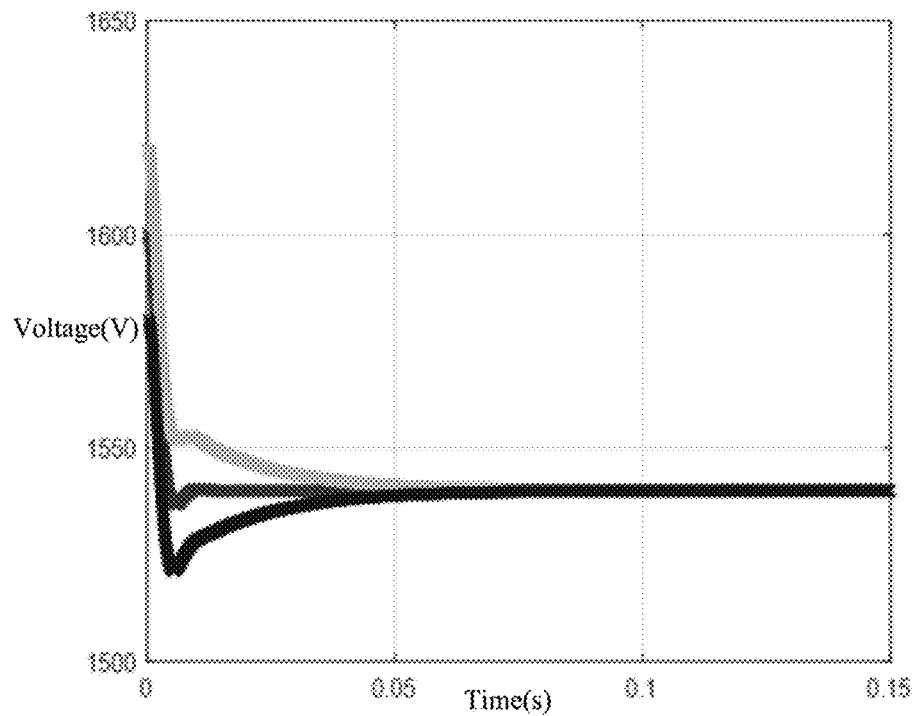
FIG. 19 is a schematic diagram of a voltage-sharing effect of a comparative example.

In a partially distributed conversion system in which three power converters are cascaded, a centralized controller sends a common-mode voltage signal to each unit controller, and communication delay affects a control bandwidth. When the communication delay increases, the control bandwidth can only be reduced, control performance will decrease, and response becomes slower. As shown in FIG. 19, a waveform of a DC-link capacitor voltage has a control period of 100p, and a given value of the DC-link capacitor voltage is 1580V. When the communication delay is 200p, dynamic responses of the voltage of the partially distributed conversion system becomes slower, a convergence time is greater than 0.03 s, a static error becomes larger, and a deviation from 1580V is very large.

Figure 20:
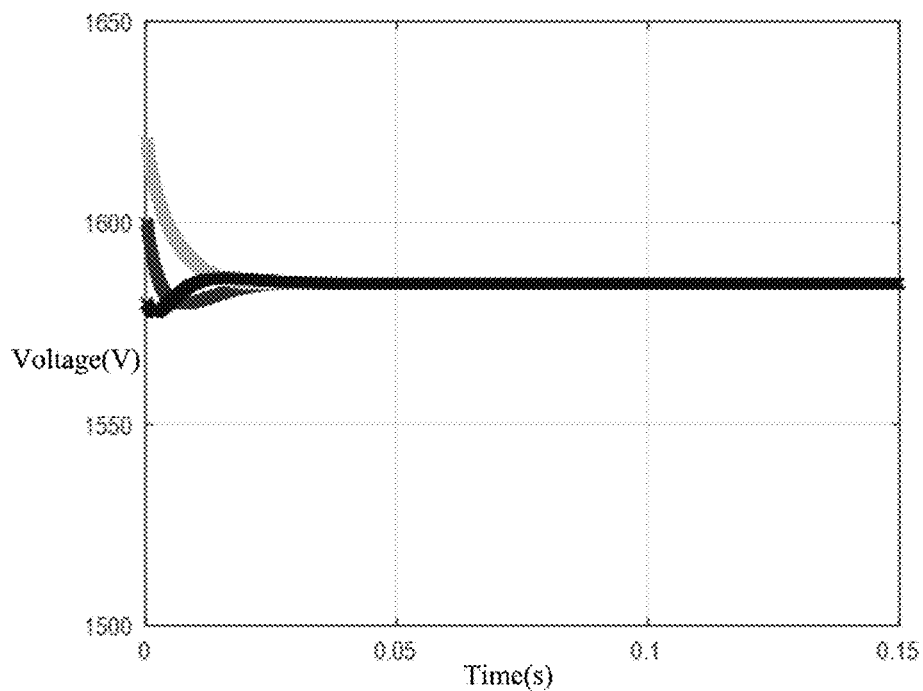
FIG. 20 is a schematic diagram of a voltage-sharing effect of an embodiment of the present application.

In a fully distributed conversion system according to the present application, common-mode voltage loop, current loop, and differential-mode voltage loop are all implemented in a controller corresponding to each power converter, and are not affected by the communication delay. The communication delay can only affect a control speed of a differential-mode voltage-sharing loop. As shown in FIG. 20, the DC-link capacitor voltage waveform has a small deviation from 1580V, and the convergence time is less than 0.025 s. Compared with FIG. 19, it obviously has a better dynamic response and a smaller static error.

The conversion system usually adopts a carrier phase shift method to form a higher equivalent switching frequency, and then generates a control signal according to a control instruction. For example: a switching frequency of each power converter is f, and an equivalent switching frequency of N power converters can reach 2Nf. If a centralized control is adopted, a centralized controller needs to control a frequency of 2Nf to achieve the effect of control of each power converter at a control frequency f. As the switching frequency of power converters increases or the number of power converters increases, the centralized control requires shorter and shorter control periods. An ideal control period Teq of the centralized controller is 1/(2N) of a switching period of the power converter, which is difficult to satisfy the demand of high frequency.

Figure 21:
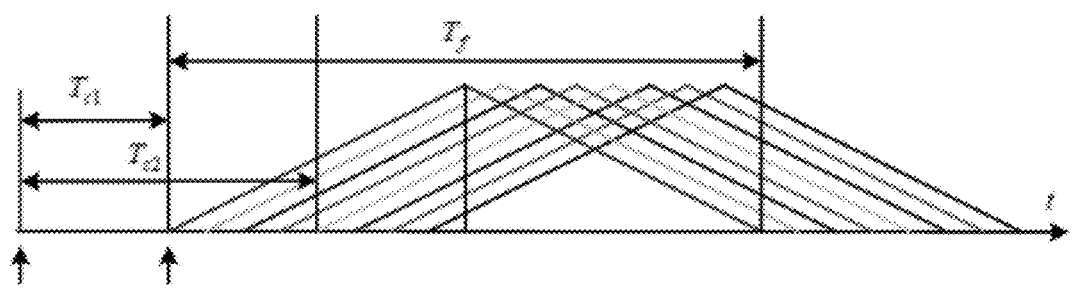
FIG. 21 is a schematic diagram of a PWM carrier of each controller in an embodiment of the present application.

As shown in FIG. 21, each triangle wave represents a loading signal of a corresponding power converter. Each power converter can only load a control output at its own carrier zero-crossing point. If the centralized control is adopted, only a first power converter can be loaded immediately, other power converters can only be loaded at their respective carrier zero-crossing point. An average control delay of the centralized control reaches Tc2+Tf/2. Tc2 is a control calculation time of the common-mode voltage loop, and Tf is a carrier cycle. If a fully distributed control is adopted, each power converter calculates a control value before its carrier zero-crossing point, and then loads a control output, which can reduce a current loop control delay. A distributed control delay is only Tc1+Tf/2, where Tc1 is a control calculation time of the current loop. A bandwidth can be increased by reducing the current loop control delay. For example, when Tc1=Tf/2, the control bandwidth can be increased by more than 30% due to a reduction of the delay.

In short, the present disclosure provides a fully distributed control conversion system without a high-performance and high-cost centralized controller, making a control of a conversion system completely modular, and flexibly configuring the number of power converters in the conversion system to deal with different voltage grades, which has a good scalability. Compared with a centralized control solution, a single point failure risk of the controller is reduced. Compared with the existing centralized control or partially distributed control schemes, distributed control reduces requirements for communication delay and can reduce communication costs. Distributed control adopts a local control, which greatly reduces requirements for chip computing capabilities, especially when it is applied in a carrier phase shift mode, and can greatly improve response speeds of current loop and common-mode voltage loop. In addition, some embodiments of the present disclosure use partial information instead of global information, and control can be carried out when only a voltage of a neighboring power converter is received, without needing to receive voltages of all the other power converters, thereby reducing requirements for the communication bandwidth.

Finally, it should be noted that the above embodiments are merely used to illustrate the technical solutions of the present application, not to limit them; although the present application has been described in detail with reference to the foregoing embodiments, those of ordinary skill in the art should understand that: it is still possible to modify the technical solutions described in the foregoing embodiments, or equivalently substitute some or all of the technical features; these modifications or substitutions do not make the essence of the corresponding technical solutions deviate from the scope of the technical solutions of the embodiments of the present application.

What is claimed is:

1. A conversion system, comprising:
   N power converters, wherein each of the N power converters comprises a first side and a second side, the first sides of the N power converters are electrically coupled in series, and currents flowing through the first sides of the N power converters are the same, and
   N controllers, corresponding to the N power converters one to one, and each of the N controllers comprises:
   a common-mode voltage loop, configured to receive a voltage reference signal and a voltage feedback signal, and output a given signal; and
   a current loop, configured to receive the given signal, a current reference signal and a first side current of a corresponding power converter, and output a common-mode control signal to modulate a first side voltage of the corresponding power converter, wherein $N \geq 2$, and N is an integer;
   wherein an information transmission structure between the N controllers is a spanning tree, wherein the N controllers comprise (N−1) controllers and a first controller, each of the (N−1) controllers comprises a calculation unit, which is configured to take an average value of a second side voltage of a corresponding power converter and a second side voltage of at least one other power converter, and use the average value as the voltage feedback signal, and the first controller uses a second side voltage of a corresponding power converter as the voltage feedback signal;
   wherein each of the (N−1) controllers further comprises a differential-mode voltage loop, which receives the voltage feedback signal, the second side voltage and a first side current of the corresponding power converter, and outputs a differential-mode control signal which is superimposed with the common-mode control signal to modulate the first side voltage of the corresponding power converter, and the first controller further comprises a differential-mode voltage loop, which receives the second side voltage and a first side current of the corresponding power converter, and outputs a differential-mode control signal which is superimposed with the common-mode control signal to modulate the first side voltage of the corresponding power converter.

2. The conversion system according to claim 1, wherein the spanning tree is a chain type or a broadcast type.

3. The conversion system according to claim 1, wherein the calculation unit only takes an average value of the second side voltage of the corresponding power converter and second side voltages of other M power converters in the conversion system, wherein $N \geq 3$, $1 \leq M \leq (N-2)$, and M is an integer.

4. The conversion system according to claim 1, wherein the common-mode voltage loop further receives an active current feed-forward value at the first side of the corresponding power converter.

5. The conversion system according to claim 4, wherein the common-mode voltage loop comprises:
   a first subtractor, configured to subtract the voltage feedback signal from the voltage reference signal to obtain a fourth intermediate variable;
   a first proportional unit, configured to perform proportional control on the fourth intermediate variable according to a first proportional coefficient to obtain a fifth intermediate variable;
   a second proportional unit, configured to perform proportional control on the fourth intermediate variable according to a second proportional coefficient to obtain an eleventh intermediate variable;
   a sixth subtractor, configured to subtract a local integral signal from a partial common-mode integral signal to obtain an integral error;
   a third proportional unit, configured to perform proportional control on the integral error according to a third proportional coefficient to obtain a twelfth intermediate variable;
   a third adder, configured to add the twelfth intermediate variable and the eleventh intermediate variable to obtain a thirteenth intermediate variable;
   an integral unit, configured to perform integral control on the thirteenth intermediate variable to obtain the local integral signal; and
   a first adder, configured to add the fifth intermediate variable, the active current feed-forward value at the first side of the corresponding power converter, and the local integrated signal to obtain the given signal;
   wherein the partial common-mode integral signal is obtained by performing weighted-average on the local integral signal generated by common-mode voltage loops in the other M controllers and the local integral signal generated by a common-mode voltage loop in a current controller, the other M controllers are neighbor controllers of the current controller.

6. A conversion system, comprising:
   N power converters, wherein each of the N power converters comprises a first side and a second side, the first sides of the N power converters are electrically coupled in series, and currents flowing through the first sides of the N power converters are the same, and
   N controllers, corresponding to the N power converters one to one, and each of the N controllers comprises:
   a common-mode voltage loop, configured to receive a voltage reference signal and a voltage feedback signal, and output a given signal; and
   a current loop, configured to receive the given signal, a current reference signal and a first side current of a corresponding power converter, and output a common-mode control signal to modulate a first side voltage of the corresponding power converter, wherein $N \geq 2$, and N is an integer;
   wherein an information transmission structure between the N controllers is a balanced graph; wherein each of the N controllers comprises a calculation unit, which is configured to take an average value of a second side voltage of a corresponding power converter and a second side voltage of at least one other power converter, and use the average value as the voltage feedback signal; the calculation unit only takes an average value of the second side voltage of the corresponding power converter and second side voltages of other M power converters, wherein N ≥ 3, 1 ≤ M ≤ (N−2), and M is an integer;

wherein each of the N controllers further comprises a differential-mode voltage loop, which receives the voltage feedback signal, the second side voltage and a first side current of the corresponding power converter, and outputs a differential-mode control signal which is superimposed with the common-mode control signal to modulate the first side voltage of the corresponding power converter.

7. The conversion system according to claim 6, wherein the balanced graph is a unidirectional ring grid, a bidirectional ring grid or a star grid.

8. The conversion system according to claim 6, wherein the differential-mode voltage loop comprises:
    a subtractor, configured to subtract the second side voltage of the corresponding power converter from the voltage feedback signal to obtain a first intermediate variable;
    a proportional unit, configured to multiply the first intermediate variable by a proportional coefficient to obtain a second intermediate variable;
    a current direction judging unit, configured to obtain an intermediate value according to a current direction of the first side of the corresponding power converter, and multiply the intermediate value by the second intermediate variable to obtain a third intermediate variable;
    an adder, configured to add the third intermediate variable and an active current feed-forward value at the first side of the corresponding power converter to obtain the differential-mode control signal.

9. The conversion system according to claim 8, wherein the proportional coefficient satisfies the following conditions:

$$0 < k_d < \frac{\frac{\pi}{N}}{\sin\frac{\pi}{N}} \frac{1}{\alpha\tau}$$

wherein, $k_d$ represents the proportional coefficient, r represents a communication time interval, $$\alpha = \frac{2}{\pi} \frac{I_{gM}}{Cv_{dc0}},$$

$I_{gM}$ represents a current amplitude of the first side of the corresponding power converter, $v_{dc0}$ represents a rated value of the second side voltage of the corresponding power converter, and C represents a capacitance of a capacitor in the corresponding power converter.

10. The conversion system according to claim 9, wherein $$k_d = \frac{1}{4\alpha\tau}.$$

11. A control method for controlling a conversion system, wherein the conversion system comprises:
    N power converters, wherein each of the N power converters comprises a first side and a second side, the first sides of the N power converters are electrically coupled in series, and currents flowing through the first sides of the N power converters are the same; and
    N controllers, corresponding to the N power converters one to one, wherein N ≥ 2, and N is an integer,
    the control method comprises:
    S1, receiving, by each of the N controllers, a voltage reference signal, a voltage feedback signal, a current reference signal, and a first side current of a corresponding power converter;
    S2, outputting, according to the voltage reference signal and the voltage feedback signal, a given signal; and
    S3, outputting, according to the given signal, the current reference signal and the first side current of the corresponding power converter, a common-mode control signal to modulate a first side voltage of the corresponding power converter;
    wherein the N controllers comprise (N−1) controllers and a first controller, and each of the (N−1) controllers takes an average value of a second side voltage of a corresponding power converter and a second side voltage of at least one other power converter to obtain the voltage feedback signal; and the method further comprises:
    S4, outputting, by each of the (N−1) controllers according to the voltage feedback signal, the second side voltage and the first side current of the corresponding power converter, a differential-mode control signal which is superimposed with the common-mode control signal to modulate the first side voltage of the corresponding power converter.

12. The control method according to claim 11, wherein each of the (N−1) controllers only takes an average value of the second side voltage of the corresponding power converter and second side voltages of other M power converters, wherein N ≥ 3, 1 ≤ M ≤ (N−2), and M is an integer.

13. The control method according to claim 11, wherein the first controller takes an average value of a second side voltage of a corresponding power converter and a second side voltage of at least one other power converter to obtain the voltage feedback signal.

14. The control method according to claim 11, wherein the first controller receives a second side voltage of a corresponding power converter as the voltage feedback signal.

15. The control method according to claim 11, wherein the S4 further comprises outputting, by the first controller according to the second side voltage and the first side current of the corresponding power converter, a differential-mode control which is superimposed with the common-mode control signal to modulate the first side voltage of the corresponding power converter.

16. A control method for controlling a conversion system, wherein the conversion system comprises:
    N power converters, wherein each of the N power converters comprises a first side and a second side, the first sides of the N power converters are electrically coupled in series, and currents flowing through the first sides of the N power converters are the same; and
    N controllers, corresponding to the N power converters one to one, wherein N ≥ 2, and N is an integer,
    the control method comprises:
    S1, receiving, by each of the N controllers, a voltage reference signal, a voltage feedback signal, a current reference signal, and a first side current of a corresponding power converter;

S2, outputting, according to the voltage reference signal and the voltage feedback signal, a given signal; and S3, outputting, according to the given signal, the current reference signal and the first side current of the corresponding power converter, a common-mode control signal to modulate a first side voltage of the corresponding power converter;

wherein the S2 further comprises:

subtracting the voltage feedback signal from the voltage reference signal to obtain a fourth intermediate variable;

performing proportional control on the fourth intermediate variable according to a first proportional coefficient to obtain a fifth intermediate variable;

performing proportional control on the fourth intermediate variable according to a second proportional coefficient to obtain an eleventh intermediate variable;

subtracting a local integral signal from a partial common-mode integral signal to obtain an integral error;

performing proportional control on the integral error according to a third proportional coefficient to obtain a twelfth intermediate variable;

adding the twelfth intermediate variable and the eleventh intermediate variable to obtain a thirteenth intermediate variable;

performing integral control on the thirteenth intermediate variable to obtain the local integral signal; and adding the fifth intermediate variable, an active current feed-forward value of the corresponding power converter, and the local integrated signal to obtain the given signal;

wherein the partial common-mode integral signal is obtained by performing weighted-average on the local integral signal generated by common-mode voltage loops in the other M controllers and the local integral signal generated by a common-mode voltage loop in a current controller, the other M controllers are neighbor controllers of the current controller.

* * * * *